(12) United States Patent
Yamasaki et al.

(10) Patent No.: US 9,001,272 B2
(45) Date of Patent: Apr. 7, 2015

(54) IMAGE SYNTHESIZING DEVICE, CODING DEVICE, PROGRAM, AND RECORDING MEDIUM

(75) Inventors: Hidekazu Yamasaki, Shiga (JP); Osamu Furuya, Osaka (JP); Akira Mitsui, Osaka (JP)

(73) Assignee: Panasonic Corporation, Osaka (JP)

( * ) Notice: Subject to any disclaimer, the term of this patent is extended or adjusted under 35 U.S.C. 154(b) by 622 days.

(21) Appl. No.: 13/357,862

(22) Filed: Jan. 25, 2012

(65) Prior Publication Data

US 2012/0120312 A1   May 17, 2012

Related U.S. Application Data

(63) Continuation of application No. PCT/JP2010/003420, filed on May 21, 2010.

(30) Foreign Application Priority Data

Jul. 28, 2009   (JP) .................................. 2009-175921

(51) Int. Cl.
*H04N 7/00* (2011.01)
*H04N 5/445* (2011.01)
*H04N 21/44* (2011.01)
*H04N 21/488* (2011.01)

(52) U.S. Cl.
CPC ........ *H04N 5/44513* (2013.01); *H04N 5/44504* (2013.01); *H04N 21/44008* (2013.01); *H04N 21/4884* (2013.01)

(58) Field of Classification Search
USPC .............. 348/458, 461; 725/151; 375/240.01, 375/240.03; 715/802
See application file for complete search history.

(56) References Cited

U.S. PATENT DOCUMENTS

| 5,298,995 | A  | * | 3/1994 | Monta et al. .................. 348/458 |
| 7,023,917 | B2 | * | 4/2006 | Nesvadba et al. ........ 375/240.03 |
| 7,647,620 | B2 | * | 1/2010 | Van Der Meer et al. ...... 725/151 |
| 2007/0094612 | A1 | * | 4/2007 | Kraft et al. .................... 715/808 |
| 2009/0092336 | A1 | * | 4/2009 | Tsurumi ....................... 382/294 |
| 2010/0194783 | A1 |   | 8/2010 | Kanamaru et al. |
| 2011/0074820 | A1 |   | 3/2011 | Nakahara et al. |
| 2011/0157211 | A1 |   | 6/2011 | Nakahara et al. |

(Continued)

FOREIGN PATENT DOCUMENTS

| EP | 1 158 788 | 11/2001 |
| JP | 5-336446 | 12/1993 |

(Continued)

OTHER PUBLICATIONS

U.S. Appl. No. 13/322,659 to Ryo Kawamura, which was filed Nov. 28, 2011.

(Continued)

*Primary Examiner* — Gims Philippe
(74) *Attorney, Agent, or Firm* — McDermott Will & Emery LLP

(57) ABSTRACT

In order to prevent obstruction of a view of a subtitle due to synthesis of the subtitle onto an object area such as a person and display of the synthesized subtitle, an image synthesizing device includes: an image synthesizing unit which synthesizes a graphics object onto an image; and a display area detecting unit which outputs a display position of an area having the lowest spatial frequency; and a drawing control unit which causes the graphics object to be drawn at the display position.

12 Claims, 19 Drawing Sheets

(56) References Cited

U.S. PATENT DOCUMENTS

| | | | |
|---|---|---|---|
| 2011/0200092 A1* | 8/2011 | Todoroki et al. | 375/240.01 |
| 2011/0254861 A1 | 10/2011 | Emura et al. | |
| 2011/0285706 A1 | 11/2011 | Daigi | |
| 2011/0310099 A1 | 12/2011 | Yamana et al. | |

FOREIGN PATENT DOCUMENTS

| | | |
|---|---|---|
| JP | 7-87392 | 3/1995 |
| JP | 2000-4407 | 1/2000 |
| JP | 2001-128062 | 5/2001 |
| JP | 2003-5739 | 1/2003 |
| JP | 2004-282137 | 10/2004 |
| JP | 2006-78693 | 3/2006 |
| JP | 2008-258929 | 10/2008 |

OTHER PUBLICATIONS

U.S. Appl. No. 61/109,618 to Masafumi Okubo et al., which was filed Oct. 30, 2008.

U.S. Appl. No. 13/296,763 to Fumio Nakamura et al., which was filed Nov. 15, 2011.

\* cited by examiner

FIG. 16

User Data Unregistered SEI

| Syntax | Data length (bit) | Mnemonic |
|---|---|---|
| user_data_unregistered(payloadSize){ | | |
| uuid_iso_iec_11578 | 128 | uimsbf |
| number_of_graphics_object_type_entries | 8 | uimsbf |
| for( i=0; i=number_of_graphics_object_type_entries; i++ ){ | | |
| graphics_object_type_id | 8 | uimsbf |
| offset_x | 16 | uimsbf |
| offset_y | 16 | uimsbf |
| width_size | 16 | uimsbf |
| height_size | 16 | uimsbf |
| } | | |
| } | | |

IMAGE SYNTHESIZING DEVICE, CODING DEVICE, PROGRAM, AND RECORDING MEDIUM

CROSS REFERENCE TO RELATED APPLICATION

This is a continuation application of PCT Patent Application No. PCT/JP2010/003420 filed on May 21, 2010, designating the United States of America, which is based on and claims priority of Japanese Patent Application No. 2009-175921 filed on Jul. 28, 2009. The entire disclosures of the above-identified applications, including the specifications, drawings and claims are incorporated herein by reference in their entirety.

BACKGROUND OF THE INVENTION (1) Field of the Invention

The present invention relates to an image synthesizing device which outputs, to a video display device, a video in which a graphics object such as a subtitle, a widget, an icon, and an animation is synthesized onto an area of image data obtained by decoding a bit stream inputted from a digital broadcast signal receiving unit or a storage unit.

(2) Description of the Related Art

In recent years, it has become possible to enjoy, while watching TV, information such as news and weather on the Internet, pictures, and various objects such as subtitles and animations that are displayed in a video.

FIG. 19 is a diagram showing a conventional image synthesizing device (game system) 91.

The image synthesizing device 91 compares luminance differences between respective display target areas (911 and so on) defined on an image and a subtitle to be displayed with each other so that a graphics object is effectively displayed on the image, and determines a display area for the subtitle (see the first page, FIG. 1, and so on of Patent Reference 1 (Japanese Unexamined Patent Application Publication No. 2008-258929), for example).

The following describes the image synthesizing device 91.

In FIG. 19, the image synthesizing device 91 includes: a storage unit 920 that is a storage device such as a hard disk for storing, for instance, a program and data and a semiconductor memory element; a control unit 930 which includes, for example, a CPU (Central Processing Unit) and centrally controls a system; and an operation unit 940 which includes, for instance, an operation button to receive an input from a user. Moreover, the storage unit 920 includes: a game program storage unit 921 which holds a game program; a video information storage unit 922 which holds an image to be displayed on a monitor 950; a subtitle information storage unit 923 which holds subtitle information; and a subtitle display position storage unit 924 which stores a subtitle display area determined by the image synthesizing device 91. Furthermore, the control unit 930 includes: a game progress control unit 931 which properly reads out and executes the game program held in the game program storage unit 921; and a subtitle display control unit 932 which reads out the subtitle information held in the subtitle information storage unit 923, determines a display position, and displays a subtitle in the read subtitle information at the determined display position on the monitor 950

The following describes operations of the image synthesizing device 91 thus configured. The subtitle display control unit 932 reads out the subtitle information held in the subtitle information storage unit 923, and obtains a luminance value of the subtitle in the read subtitle information. The subtitle display control unit 932 obtains, for each image to be displayed, a luminance value of each of subtitle display areas 911 to 914 that are predetermined in the system, and evaluates luminance differences between the subtitle and the respective subtitle display areas 911 to 914. As a result, when the luminance difference between the subtitle and the subtitle display area becomes equal to or greater than a threshold, a subtitle display area having the luminance difference equal to or greater than the threshold is determined as a subtitle display area in which the subtitle is to be displayed.

SUMMARY OF THE INVENTION

However, the image synthesizing device 91 displays, based on the luminance difference, the subtitle in an area where the subtitle is easily viewable, and thus there has been a problem that even if the area is an object area in which, for instance, a human figure is shown, the subtitle is superimposed onto the object area and displayed, which obstructs a view of the subtitle.

An area having a high spatial frequency is, for example, the object area, and thus the area has a high degree of necessity for a view. Thus, obstructing the view of the area having the high spatial frequency obstructs the view of the area having the high degree of necessity for the view.

An object of the present invention is to surely enable the view of the area having the high degree of necessity for view, even though a graphics object (e.g. a subtitle) is synthesized onto the area.

In order to solve the above problem, an image synthesizing device according to an aspect of the present invention includes: a graphics drawing unit configured to draw a graphics object; an image synthesizing unit configured to synthesize, onto an image, the graphics object drawn by the graphics drawing unit; a detection unit configured to analyze a spatial frequency of each of areas in the image, detect, among the areas, an area having the lowest analyzed spatial frequency, and output a display position of the detected area; and a drawing control unit configured to control the graphics drawing unit so that the graphics drawing unit draws the graphics object at the display position in the image which is outputted by the detection unit.

It is to be noted that, here, the graphics object is a synthesis target image which is synthesized onto a synthesis destination image.

In other words, when the synthesis destination image is an image that is focused and captured, an area that is focused in the image is an area having a high degree of necessity for a view. The graphics object is synthesized onto an area having a low spatial frequency, and thus the graphics object is not synthesized onto such an area that is focused. In short, the graphics object is synthesized onto an area that is not focused.

Consequently, even when the synthesis destination image is the image that is focused and captured, it is possible to surely prevent obstruction of the view of the area having the high degree of necessity for the view, and thus ensure, when displaying the area having the high degree of necessity for the view, viewability of the area.

In addition, the graphics object is synthesized onto the area that is not focused, and thus the graphics object is synthesized onto an area having a relatively uniform image. For this reason, a content of a synthesis target image is not blended into a background, and it is possible to surely distinguish the content from the background after the synthesis.

Furthermore, a proper area is determined based on a simple spatial frequency, and thus special information such as information for determining an area designated by a user is not necessary. As a result, it is possible to easily synthesize the object graphics onto the proper area.

It is to be noted that when the synthesis destination image is an image at the time of a scene change in a video, the image synthesizing device may not synthesize the graphics object onto an area detected in the image, and only when the synthesis destination image is not the image at the time of the scene change in the video, the image synthesizing device may synthesize the graphics onto the area detected in the image. Here, content of an image drastically changes between a first synthesis destination image and a second synthesis destination image at the time of the scene change, and an area to be detected is prone to change. In this situation, it is possible to avoid synthesizing the graphics object onto the detected area.

The image synthesizing device further includes: a decoding unit configured to decode a bit stream inputted to the image synthesizing device from, for instance, one of a digital broadcast signal receiving unit and a storage unit; and an object data storage unit configured to hold object data of the graphics object. The image synthesizing unit may perform the synthesis for the image indicated by a video signal obtained by the decoding unit decoding the bit stream, and the drawing control unit may control the graphics drawing unit based on the object data held in the object data storage unit so that the graphics drawing unit draws the graphics object indicated by the object data.

An image synthesizing device according to an implementation of the present invention synthesizes a graphics object onto an area having a low spatial frequency in an image. For this reason, it is possible to display the graphics object without superimposing the graphics object on an area which is focused by a camera and has a high spatial frequency such as an area of an object. Moreover, because a video is not reduced to be displayed so that the graphics object is displayed, it is possible to view the video with original resolution.

BRIEF DESCRIPTION OF THE DRAWINGS

These and other objects, advantages and features of the invention will become apparent from the following description thereof taken in conjunction with the accompanying drawings that illustrate a specific embodiment of the invention. In the Drawings:

FIG. 16 is a table showing a structure of User Data Unregistered SEI in Modification 4;

DESCRIPTION OF THE PREFERRED EMBODIMENT

Figure 1:
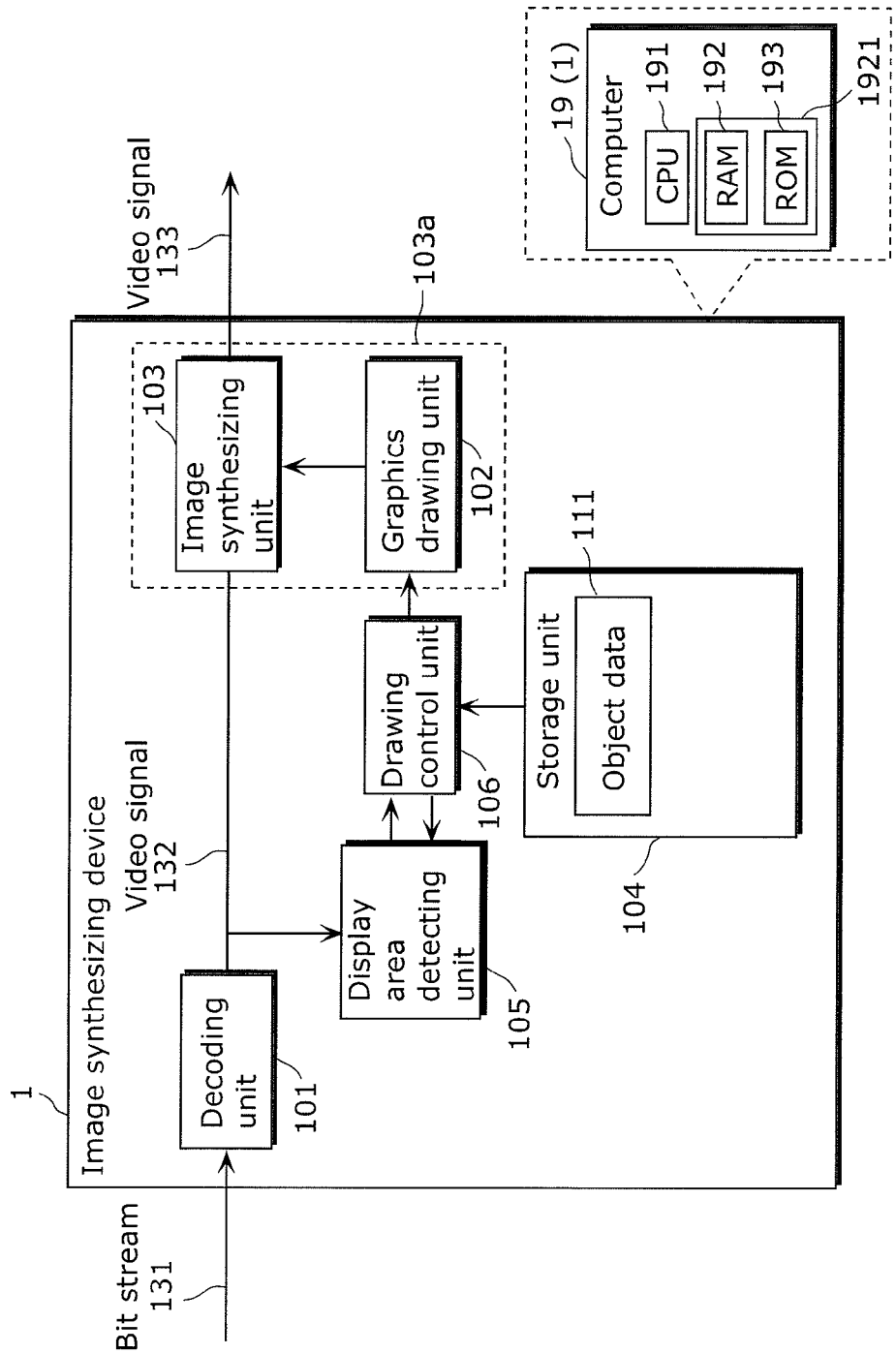
FIG. 1 is a block diagram showing an image synthesizing device according to an embodiment.

The following describes an image synthesizing device according to an embodiment with reference to the drawings. It is to be noted that constituent elements to which the same reference signs are assigned in the embodiment perform the same operations, and thus there is a case of omitting re-descriptions thereof.

The embodiment is intended to achieve the following purpose. Conventionally, a display area in which a subtitle is displayed is determined for each of images to be displayed. As a result, there has been a problem that when, for example, a device is used for displaying a movie video, changing a display position of a subtitle many times during a subtitle display period of several seconds damages the visibility of the subtitle. The purpose is to solve this problem.

The following describes an image synthesizing device A1 according to the embodiment.

The image synthesizing device A1 (e.g. an image synthesizing device 1) is an image synthesizing device which includes: a graphics drawing unit (a graphics drawing unit 102) which draws a graphics object (a subtitle); an image synthesizing unit (an image synthesizing unit 103) which synthesizes, onto an image, the graphics object drawn by the graphics drawing unit; a detection unit (a display area detecting unit 105) which analyzes a spatial frequency (e.g. a representative frequency to be described later) of each of areas (areas R) in the image (a image before synthesis I in FIGS. 3 and 4), detects, among the areas, an area (an area RI) having the lowest analyzed spatial frequency, and outputs a display position of the detected area; and a drawing control unit (a drawing control unit 106) which controls the graphics drawing unit so that the graphics drawing unit draws the graphics object at the display position in the image which is outputted by the detection unit.

An image synthesizing device A2 is the image synthesizing device A1 which includes: a decoding unit (a decoding unit 101) which decodes a bit stream (a bit stream 131) inputted to the image synthesizing device A2 from one of a digital broadcast signal receiving unit and a storage unit; and an object data storage unit (a storage unit 104) which holds object data (object data 111) of the graphics object. The image synthesizing unit performs the synthesis for the image indicated by a video signal (a video signal 132) obtained by the decoding unit decoding the bit stream, and the drawing control unit controls the graphics drawing unit based on the object data held in the object data storage unit so that the graphics drawing unit draws the graphics object.

The following describes an image synthesizing device B1 according to the embodiment.

The image synthesizing device B1 (e.g. the image synthesizing device 1) is an image synthesizing device which decodes a bit stream inputted from one of a digital broadcast signal receiving unit and a storage unit and synthesizes a graphics object onto an image obtained by the decoding, and which includes: a decoding unit (the decoding unit 101) which decodes the inputted bit stream; a graphics drawing unit (the graphics drawing unit 102) which draws the graphics object; an image synthesizing unit (the image synthesizing unit 103) which synthesizes the graphics object onto the image obtained by the decoding; a storage unit (the storage unit 104) which holds object data of the graphics object; a display area detecting unit (the display area detecting unit 105) which analyzes a spatial frequency for each of decoded images, detects an area (the area RI) having a low spatial frequency, and outputs a display position of the area; and a drawing control unit (the drawing control unit 106) which controls the graphics drawing unit based on the object data of the selected graphics object so that the graphics drawing unit draws the graphics object at the display position outputted by the display area detecting unit.

With this configuration, detecting the area having the low spatial frequency in each image makes it possible to effectively synthesize the selected graphics object onto an area which is focused by a camera and has a high spatial frequency such as an object.

Moreover, an image synthesizing device B2 is the image synthesizing device B1 in which the display area detecting unit divides a part or a whole of the image into a plurality of blocks (pixel blocks), calculates a spatial frequency for each of the blocks, and determines, from among the areas each of which includes the blocks suitable for a graphics object size, the area having the lowest spatial frequency.

With this configuration, it is possible to detect, in the image, the area which can display the graphics object and has the lowest spatial frequency.

Moreover, an image synthesizing device B3 is the image synthesizing device B1 in which the storage unit further holds, for each of types of selectable graphics object, an object identifier for the type, at least one display target area information item which defines a display area of the graphics object, and normal display cycle information which defines a display interval of the graphics object.

With this configuration, it is possible to define in advance the display target area and the display interval for each type of graphics object based on characteristics of the graphics object.

Moreover, an image synthesizing device B4 is the image synthesizing device B3 in which the drawing control unit determines, for each of display times, display target area information including the display position outputted from the display area detecting unit, from among display target area information items, and the detection unit determines, from among display positions in the display area defined by the display target area information, a display position until the next display time.

With this configuration, it is possible to enhance readability of the graphics object by narrowing down, for each display time, an area in which the graphics object can be displayed.

Moreover, an image synthesizing device B5 relates to the above purpose and is the image synthesizing device B1 in which the display area detecting unit compares the detected display position to the last detected display position, further includes a counter which adds a value when a movement distance is less than a threshold and initializes the value when the movement distance is equal to or greater than the threshold, outputs a display position immediately detected, when a value of the counter is equal to or greater than the threshold, and outputs, when the value of the counter is less than the threshold, the last detected display position until the value of the counter becomes equal to or greater than the value of the counter, so as to wait for stabilization of the display position of the graphics object at the time of a scene change.

With this configuration, it is possible to reduce an increase in the number of times the display position of the graphics object is moved in the case where a spatial frequency distribution changes with the scene change, and thus to enhance the readability of the graphics object.

Moreover, an image synthesizing device B6 is the image synthesizing device B5 in which the display area detecting unit analyzes the video signal and performs a transition prediction of the area having the low spatial frequency.

With this configuration, it is possible to predict transition of the display position of the graphics object in the case where the spatial frequency distribution changes with the scene change, to reduce the movement of the graphics object, and thus to enhance the readability of the graphics object.

Moreover, an image synthesizing device B7 is the image synthesizing device B1 which further includes a color information comparison unit which (i) calculates a ratio between color information of a decoded image corresponding to the area detected by the display area detecting unit and color information of the graphics object to be drawn, (ii) calculates, when the calculated ratio is equal to or less than a threshold, color information of the graphics object so that a ratio to be calculated from the color information of the decoded image and the color information of the graphics object is greater than the threshold, and (iii) outputs the calculated color information to the drawing control unit.

With this configuration, when the synthesized graphics object is difficult to view as the ratio between the color information of the decoded image corresponding to the area in which the graphics object is displayed and the color information of the graphics object is small, it is possible to prevent visibility of the graphics object from being reduced. In other words, changing the color information of the graphics object makes it possible to enhance the visibility of the graphics object.

Moreover, an image coding device B8 is an image coding device which encodes, as a bit stream, a video signal inputted from a decoding unit or a storage unit, and includes: a storage unit which holds, for each type of selectable graphics object, an object identifier and a normal object size which defines a normal size of the graphics object; a display area detecting unit which sequentially reads out all normal object sizes held in the storage unit, analyzes a spatial frequency of the inputted video signal, detects an area having the lowest spatial frequency, and outputs the detected display position and the normal object size; and an encoding unit which describes, in the bit stream, object display information including at least the display position and normal object size outputted by the display area detecting unit.

With this configuration, when resolution is reduced and a bit stream is re-encoded, for a mobile terminal, in especially a BD (Blu-ray Disc) recorder and so on, it is possible to provide, for the mobile terminal, units which make it possible to synthesize, onto a video, a graphics object selected by the mobile terminal, with low power consumption and in an effective manner.

Moreover, an image synthesizing device B9 is an image synthesizing device which decodes a bit stream inputted from a digital broadcast signal receiving unit or a storage unit, synthesizes a selected graphics object onto an image obtained by the decoding, and displays the synthesized graphics object, and includes: a graphics drawing unit which draws a graphics object; an image synthesizing unit which synthesizes the drawn graphics object onto the image obtained by the decoding; a storage unit which holds object data of the graphics object; a decoding unit which outputs predefined object display information which is obtained from the inputted bit stream and includes at least a display position and an object size; a display area selection unit which outputs a display position and an object size of a selected graphics object which are obtained from the object display information; and a graphics drawing unit which draws the selected graphics object in an area outputted from the display area selection unit.

With this configuration, it is possible to synthesize the selected graphics object onto the video in especially the mobile terminal with the low power consumption and in the effective manner.

Moreover, an image coding device B10 is the image coding device B8 which (i) further includes an image analysis unit which detects an amount of characteristic by analyzing the video signal, and select a graphics object suitable for the video signal based on the amount of characteristic, and (ii) codes, into the bit stream, object display information including at least an object identifier of the selected graphics object, the detected amount of characteristic, display time information, the display position detected by the display area detection unit, and an object size.

With this configuration, units which allow effective synthesis of the graphics object suitable for the video are provided, and thus it is possible to easily provide a visual reality which cannot be provided by merely recording the video.

Moreover, an image coding device B11 is the image coding device B9 in which the decoding unit outputs predefined object display information which is obtained from the inputted bit stream and includes at least an object identifier, an amount of characteristic of a video, display time information, a display position, and an object size, and the drawing control unit causes the graphics object to be drawn based on the inputted object display information.

With this configuration, it is possible to easily provide the visual reality which cannot be provided by merely recording the video.

(Embodiment)

First, an embodiment (FIGS. 1 to 7) is described. Then, modifications (FIGS. 8 to 18) of the embodiment are described.

The following describes an image synthesizing device 1 (FIG. 1) which determines, in a decoded image, an area having a low spatial frequency, and synthesizes a graphics object (synthesis target image) onto the determined area. It is to be noted that here, for the sake of simplification, a case is described as an example where the image synthesizing device 1 synthesizes a subtitle as a graphics object onto an image obtained by decoding a bit stream which is recorded in HD resolution (1920 pixels×1080 lines) and compliant with the ISO/IEC 14496-10.

FIG. 1 is a block diagram showing the image synthesizing device 1 according to the embodiment.

In the image synthesizing device 1, a decoding unit 101 decodes a bit stream 131 inputted to the image synthesizing device 1 from a digital broadcast signal receiving unit or a storage unit. Then, an image synthesizing unit 103 synthesizes a subtitle (synthesis target image) on a video signal 132 generated by the decoding unit 101 decoding the bit stream 131. It is to be noted that the digital broadcast signal receiving unit and the storage unit may be, for example, a part of the decoding unit 101. The image synthesizing device 1 includes the decoding unit 101, a graphics drawing unit 102, the image synthesizing unit 103, a storage unit 104, a display area detecting unit 105, and a drawing control unit 106. Furthermore, the storage unit 104 holds object data 111. It is to be noted that the expression "the storage unit 104 holds object data 111" means, for instance, that the storage unit 104 stores the object data 111.

The decoding unit 101 decodes the inputted bit stream 131, and outputs the video signal 132 having an HD resolution. The video signal 132 is a video signal generated by decoding the bit stream 131.

The graphics drawing unit 102 draws a subtitle (a subtitle image or a graphics object) based on control by the drawing control unit 106. More specifically, for instance, the graphics drawing unit 102 generates data for identifying the subtitle image. It is to be noted that the drawing determines an area for the subtitle in a whole image onto which the subtitle is to be synthesized.

The image synthesizing unit 103 outputs a video signal 133 generated by synthesizing the video signal 132 generated by the decoding unit 101 decoding the bit stream 131 and the subtitle drawn (generated) by the graphics drawing unit 102. Here, an area for the subtitle which is indicated by the video signal 133 and is in the image onto which the subtitle is synthesized is the same as the area determined by the drawing.

The storage unit 104 is a storage device such as a semiconductor memory element. The storage unit 104 stores the object data 111.

The object data 111 is data for identifying a subtitle (subtitle image, graphics object, or synthesis target image). For example, when an identified synthesis target image is the subtitle, the object data 111 is data including subtitle information, a display position, a font size, a font color, a background color, a display time, and so on.

Figure 2:
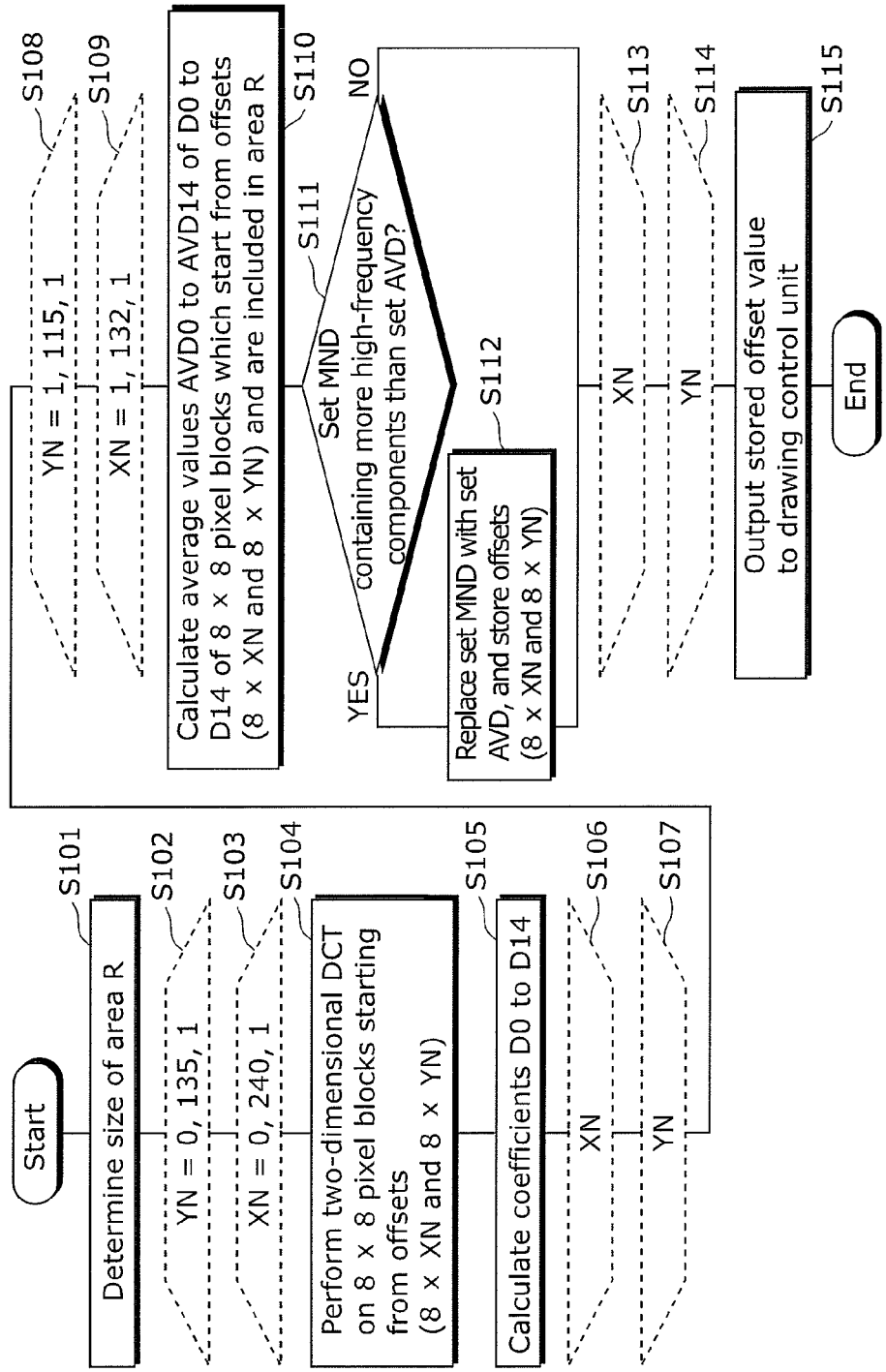
FIG. 2 is a flowchart for a display area detecting unit according to the embodiment.

FIG. 2 is a flowchart showing processing performed by the display area detecting unit 105.

Figure 3:
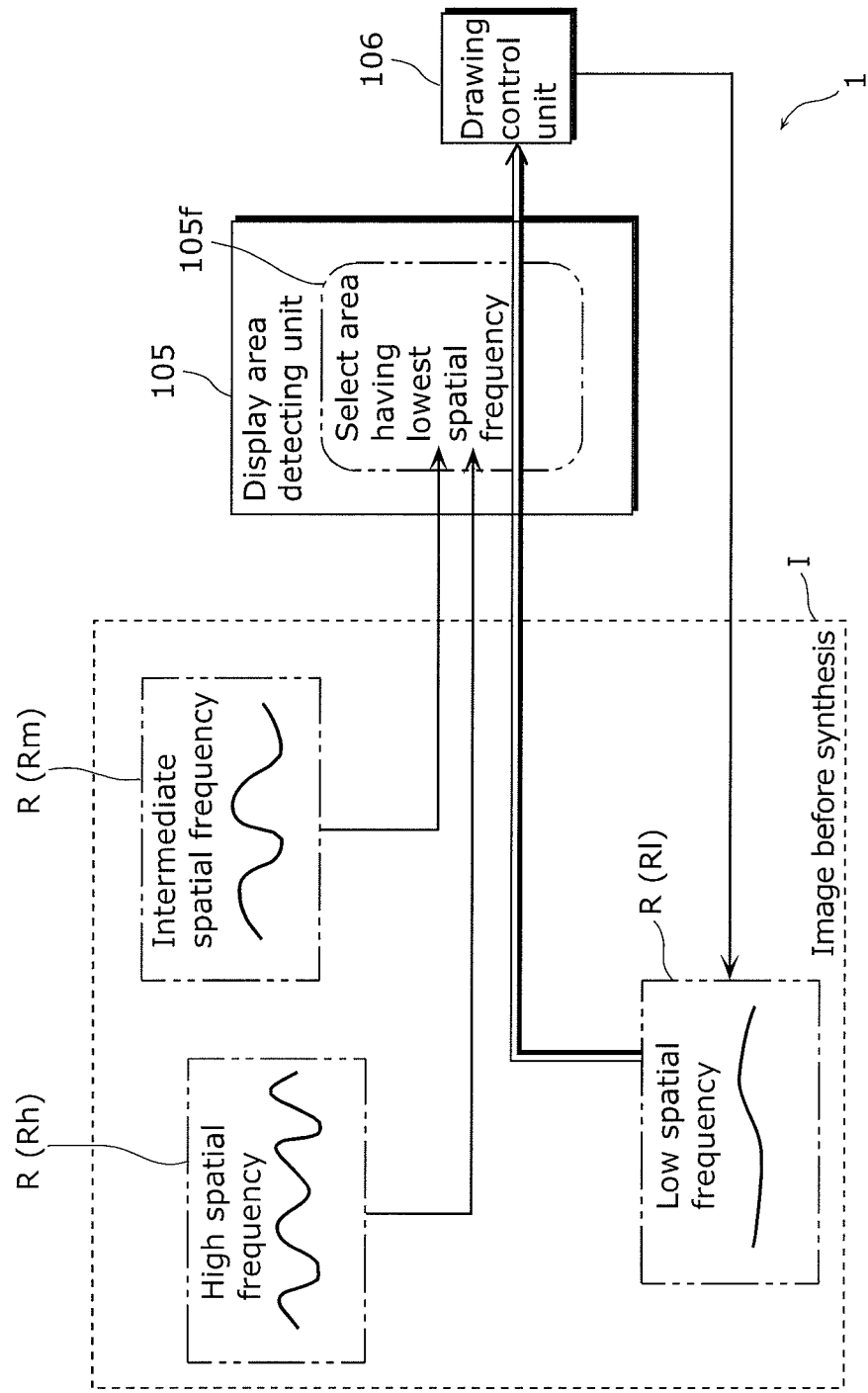
FIG. 3 is a diagram showing the display area detecting unit, a drawing control unit, and an image before synthesis.

FIG. 3 is a diagram showing the display area detecting unit 105, the drawing control unit 106, and an image before synthesis I.

The display area detecting unit 105 analyzes spatial frequencies of an image (the image before synthesis I) decoded by the decoding unit 101 (step S104), and detects an area (an area RI) which is suitable for a size of a subtitle display area outputted from the drawing control unit 106 and has the lowest spatial frequency (function 105f). Then, the display area detecting unit 105 outputs, to the drawing control unit 106, a display position of the detected area (the area RI) as a position at which the subtitle should be synthesized (step S115).

It is to be noted that the display area detecting unit 105 can be normally configured with an MPU, a memory, and so on. Moreover, a procedure followed by the display area detecting unit 105 is normally implemented with software, and the software is recorded on a recording medium such as a ROM. However, the display area detecting unit 105 may be implemented with hardware (a dedicated circuit).

The drawing control unit 106 sequentially reads out, from the storage unit 104, the object data 111 corresponding to a subtitle selected by a user and calculates, for each display time, a size of a subtitle display area of the subtitle at the display time so that the subtitle is drawn. Then, the drawing control unit 106 outputs, to the display area detecting unit 105, the size of the calculated subtitle display area every time an image is decoded by the decoding unit 101, and causes the display area detecting unit 105 to determine a display position (a synthesis position) of the subtitle. Furthermore, the drawing control unit 106 causes the graphics drawing unit 102 to draw the subtitle at the determined display position.

It is to be noted that the drawing control unit 106 can be normally configured with the MPU, the memory, and so on. A procedure followed by the drawing control unit 106 is normally implemented with the software, and the software is recorded on a recording medium such as a ROM. However, the drawing control unit 106 may be implemented with the hardware (the dedicated circuit).

It is to be noted that, for instance, it can be understood that a user input unit provided to the image synthesizing device 1 inputs, to the image synthesizing device 1, data for identifying a subtitle selected by the user, and thus selects the subtitle indicated by the inputted data.

Figure 4:
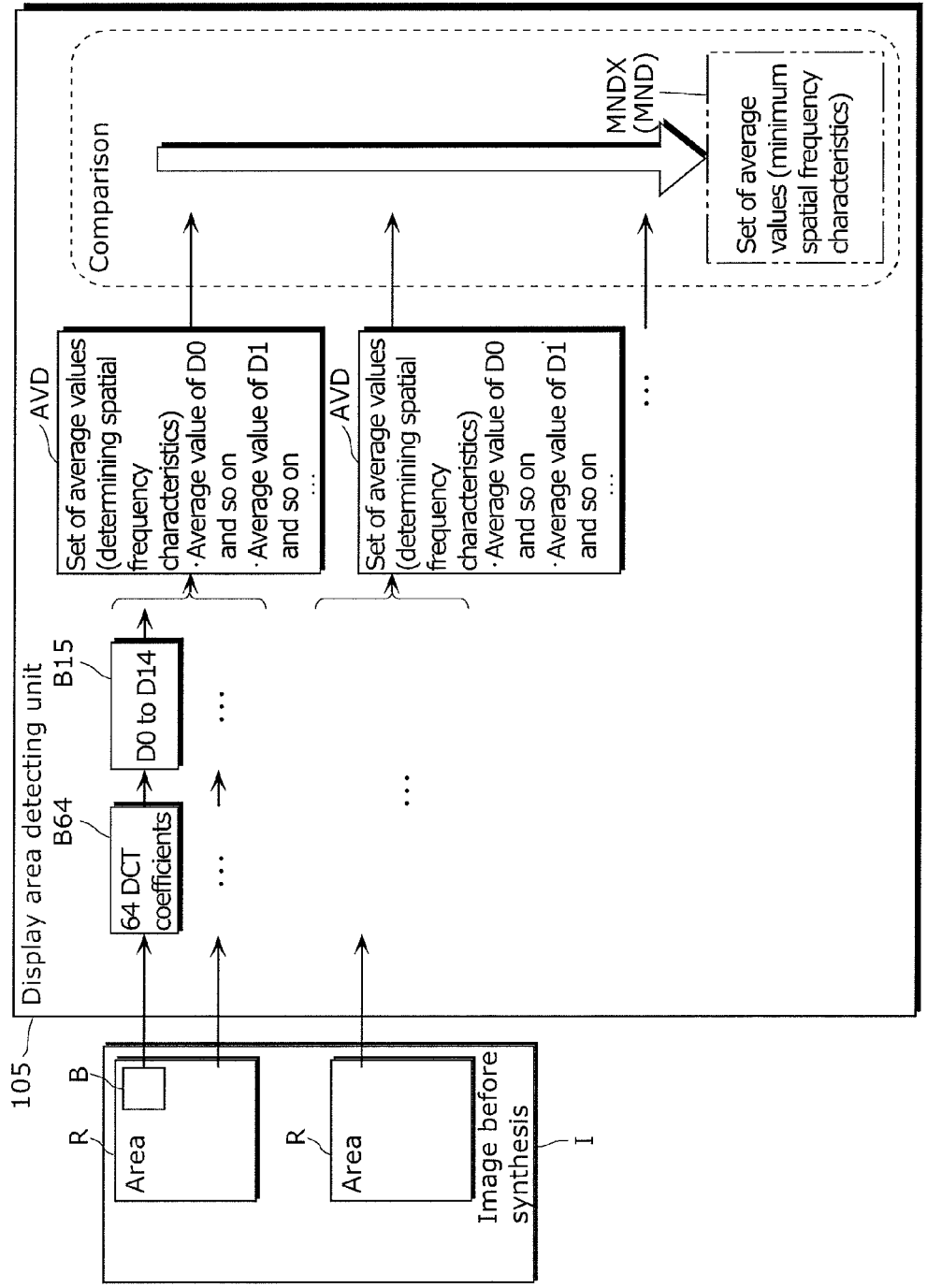
FIG. 4 is a diagram showing the display area detecting unit and data in the image synthesizing device.

FIG. 4 is a diagram showing the image before synthesis I and the display area detecting unit 105.

The following describes in detail operations of the display area detecting unit 105 in the image synthesizing device 1 according to the embodiment. In the description, specifically, the drawing control unit 106 (FIGS. 1 and 3) inputs, to the display area detecting unit 105, an area (area R in FIG. 4) having 860 pixels×160 lines (area identification data for identifying an area) as a size of a subtitle display area. The display area detecting unit 105 detects an area which can include the area (the subtitle display area) and has the lowest spatial frequency. It is to be noted that the description is given with reference to the flowchart in FIG. 2.

The display area detecting unit 105 divides, for a luminance component of an image (the image before synthesis I), the image on an 8-pixel×8-line block basis so as to perform spatial frequency analysis on the image (see steps S102, S103, S106, and S107). Then, the display area detecting unit 105 performs two-dimensional DCT (Discrete Cosine Transform) on each of divided pixel blocks (a pixel block B in FIG. 4) (step S104). Equation 1 below is a two-dimensional DCT equation for an image f (x, y) (x=0, . . . , 7, y=0, . . . , 7).

[Math. 1]

$$F(u, v) = C(u)C(v) \sum_{x=0}^{N-1} \sum_{y=0}^{N-1} f(x, y) \cos\left\{\frac{(2x+1)u\pi}{2N}\right\} \cos\left\{\frac{(2y+1)v\pi}{2N}\right\}$$

(Equation 1)

Note $N = 8$

The display area detecting unit 105 obtains 64 DCT coefficients F (u, v) (64 DCT coefficients B64 in FIG. 4) for each pixel block as a result of the transform.

Figure 5:
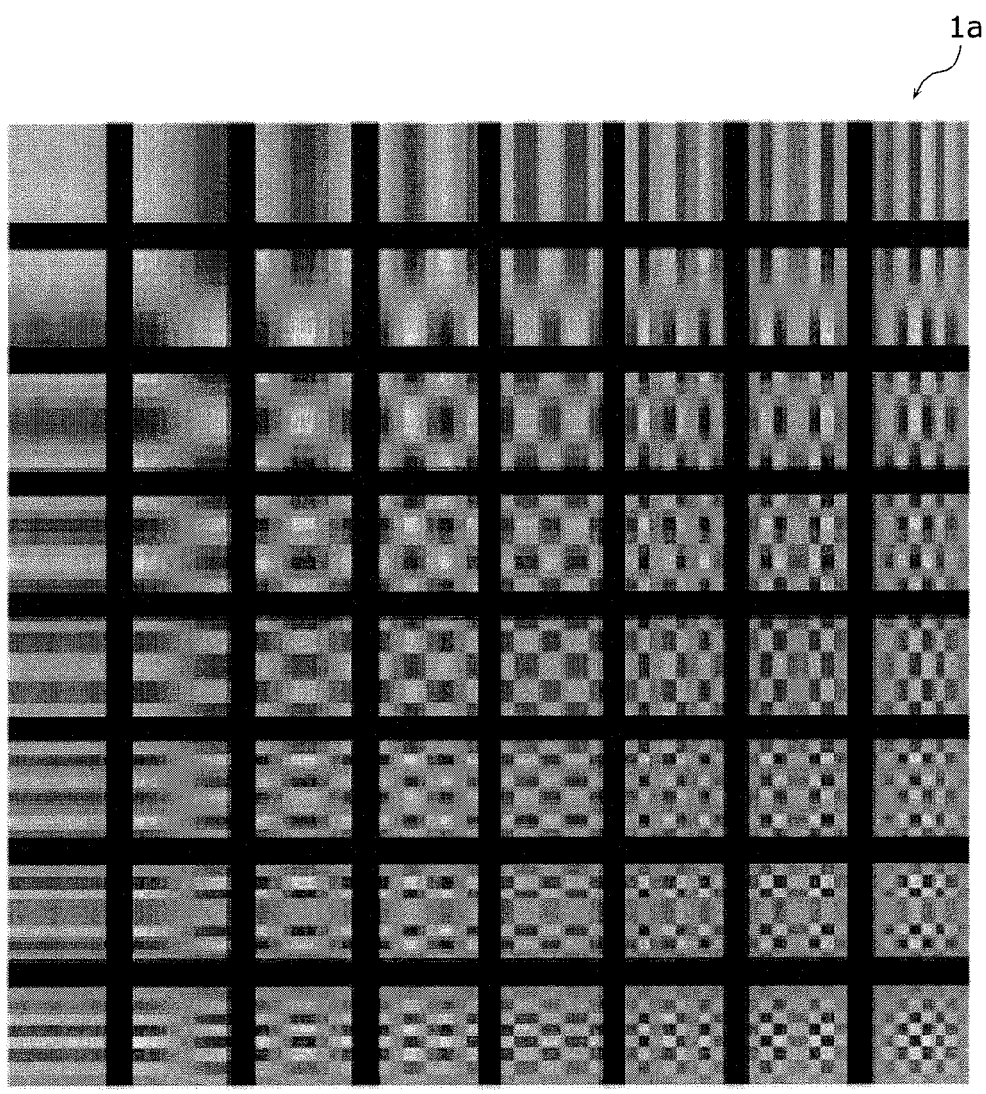
FIG. 5 is a diagram showing a DCT-based image composed of 8 pixels×8 lines.

FIG. 5 is a diagram showing a DCT-based image 1a composed of 8 pixels×8 lines.

Figure 6:
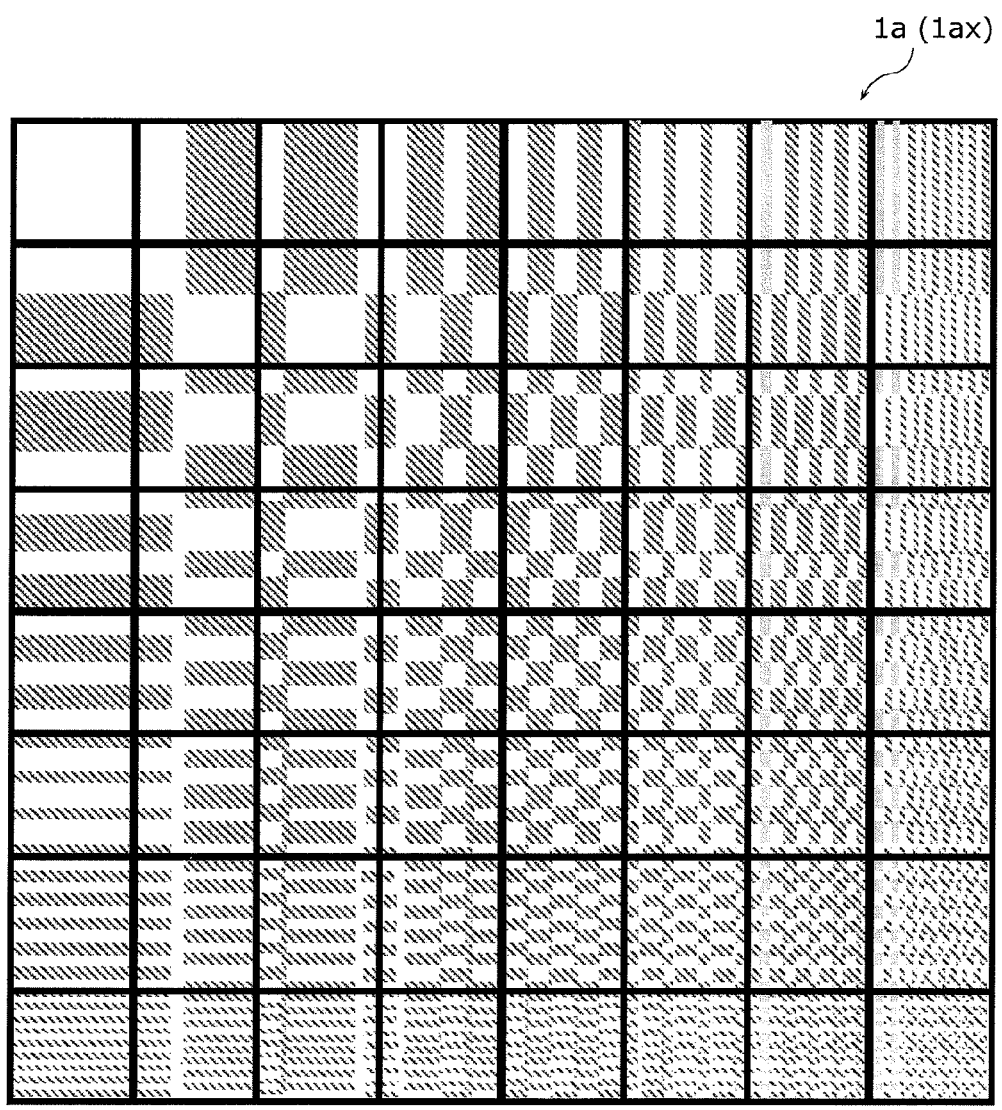
FIG. 6 is a diagram showing a schematic representation of the DCT-based image.

FIG. 6 is a diagram showing a schematic representation of a DCT-based image 1ax (the DCT-based image 1a). Please also refer to the DCT-based image 1ax accordingly.

The DCT-based image 1a shows a waveform of each of the 64 DCT coefficients B64 obtained by the display area detecting unit 105.

Parts of the DCT-based image 1a show frequency components in a horizontal direction which increase toward a right side of the DCT-based image 1a, and other parts of the DCT-based image 1a show frequency components in a vertical direction which increase toward a bottom side of the DCT-based image 1a. Each pixel block (the pixel block B in FIG. 4) obtained by dividing the image is represented by a linear combination of (i) the 64 DCT coefficients obtained by the display area detecting unit 105 performing the DCT transform on the pixel block and (ii) a corresponding base image. In other words, the 64 DCT coefficients B64 obtained by the display area detecting unit 105 identify the pixel block B.

In step S101, the display area detecting unit 105 determines an area R which can include 860 pixels×160 lines that are a subtitle display area and is composed of 8×8 pixel blocks (pixel blocks B). In this case, for example, the display area detecting unit 105 determines, as the area R, an area of 108× 20 blocks.

In step S102 (and step S107), the display area detecting unit 105 performs control for repeating processes in steps S102 to S107 so that a spatial frequency of each pixel block is calculated. More specifically, the display area detecting unit 105 causes the following steps to be repeated 135 times in step S102 so as to perform spatial frequency analysis in the vertical direction of the decoded image.

In step S103 (and step S106), the display area detecting unit 105 causes the following steps to be repeated 240 times so as to perform the spatial frequency analysis in the horizontal direction of the decoded image.

In step S104, the display area detecting unit 105 performs the two-dimensional DCT for a luminance component of each pixel block, and calculates 64 DCT coefficients (the 64 DCT coefficients B64) for each pixel block.

Figure 7:
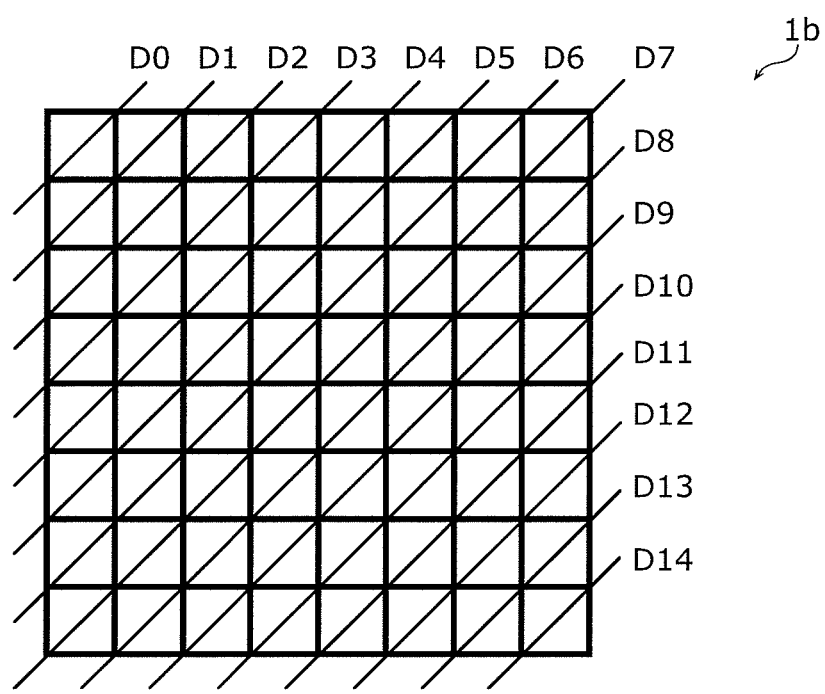
FIG. 7 is a diagram showing DCT coefficients for spatial frequency analysis in the embodiment.

FIG. 7 shows a table 1b of 15 columns into which the 64 DCT coefficients are divided.

In step S105, the display area detecting unit 105 divides the 64 DCT coefficients calculated in step S104 into the 15 columns as shown in FIG. 7, and calculates an average for each column. Consequently, the display area detecting unit 105 calculates 15 coefficients D0 to D14 (15 coefficients B15). Here, each coefficient D (each of the coefficients D0 to D14) shows an energy distribution from low-frequency components to high-frequency components.

In step S106, when the display area detecting unit 105 performs the spatial frequency analysis in the horizontal direction of each block 240 times, the display area detecting unit 105 sets a horizontal pixel offset to 0, and proceeds to the next step (S107). When the spatial frequency analysis in the horizontal direction is not performed 240 times, the display area detecting unit 105 adds 8 to the horizontal pixel offset, and returns to step S103.

In step S107, when the display area detecting unit 105 performs the spatial frequency analysis in the vertical direction of each block 135 times, the display area detecting unit 105 proceeds to the next step (S108). When the spatial frequency analysis in the vertical direction is not performed 105 times, the display area detecting unit 105 adds 8 to a vertical pixel offset, and returns to step S102.

To put it differently, in steps S102 to S107, the display area detecting unit 105 determines the 64 DCT coefficients B64 (FIG. 4) for each pixel block B in the image before synthesis I (FIG. 4), and thus determines the 15 coefficients B15 (FIGS. 4 and 7) for each pixel block B (step S105). As a result, in steps S102 to S107, the display area detecting unit 105 determines, for each of areas R, the 64 DCT coefficients B64 and the 15 coefficients B15 of each pixel block B making up a corresponding one of the areas R.

Then, the image synthesizing device 1 performs processes in steps S108 to S114 so as to detect, among the areas R in the decoded image (the image before synthesis I), an area R (the area RI in FIG. 3) which has the lowest spatial frequency and the size determined in step S101

The image synthesizing device 1 repeats the following steps 115 times so as to perform the spatial frequency analysis in the vertical direction of the decoded image (steps S108 and S114).

In step S109, the image synthesizing device 1 performs the following steps 132 times so as to perform the spatial frequency analysis in the horizontal direction of the decoded image.

In step S110, an average value is calculated for each of a group of coefficients D0 to a group of coefficients D14. Stated differently, an average value of each group of the coefficients (e.g. D0) is calculated for pixel blocks B in an area to be processed. In other words, the average value is calculated for each of the group of the coefficients D0 to the group of the coefficients D14 in the pixel blocks B, the coefficients D0 to D14 being calculated in step S105. The average values of the group of the coefficients D0 to the group of the coefficients D14 are called AVD0 to AVD14, respectively. In short, the display area detecting unit 105 calculates the AVD0 to the AVD14. In sum, in step S110, the display area detecting unit 105 calculates the average value of the coefficients D0, the average value of the coefficients D1, . . . the average value of the coefficients D14 in the area R to be processed. Consequently, the display area detecting unit 105 computes (calculates) a set of average values AVD (FIG. 4) which consists of the calculated 14 average values. It is to be noted that, as described in detail below, the set of average values AVD is calculated for each of the areas R.

The calculated set of average values AVD determines an evaluation value of high frequency characteristics (spatial frequency characteristics) of the area R for which the set of average values AVD is calculated. For instance, the determined evaluation value is obtained from the following formula "$10\char`^(-1) \times avN + 10\char`^(-2) \times av(N-1) + + 10\char`^(-N) \times av1$" which is defined by average values av1, av2, . . . avN in order of low to high frequency which are included in the set of average values AVD. It is to be noted that, here, a^b denotes raising a to b power.

Here, the evaluation value of the high frequency characteristics increases as the area R contains a greater number of higher-frequency components. The greater the evaluation value of the high frequency characteristics is, the more necessary it is for the user to view an original image of the area R, because, for example, the area R is a focused area of an object. For this reason, the greater the evaluation value of the high frequency characteristics is, the more easily an adverse effect is caused by obstructing a view of the original image of the area R due to synthesis of a synthesis target image (a subtitle).

To put it differently, the set of average values AVD determines a degree of necessity for a view of the area R for which the set of average values AVD is calculated.

In step S111, a process is performed for the set of average values AVD of the coefficients in the area R to be processed which are calculated in step S110. More specifically, the process is performed for, between the current set of average values AVD and a set of average values AVD for at least one area R which is previously processed, a set of average values AVD (a set of average values MND (FIG. 4)) which has the lowest spatial frequency (the determined smallest evaluation value of the high frequency characteristics).

Stated differently, the display area detecting unit 105 compares the coefficients of the current set of average values AVD to the coefficients of the set of average values MND in ascending order from the coefficient D14 to the coefficient D0 (in descending order from a coefficient having a high frequency).

Consequently, for instance, when a result of comparison of K-th coefficients shows that the K-th coefficients are the same, where K satisfies K<K≤N, as described blow, one of the sets of average values is determined as a set of average values having a lower evaluation value of the high frequency characteristics. In short, when a result of comparison of Ka-th coefficients shows that the Ka-th coefficient of the one of the sets of average values is smaller than that of the other set of average values, the set of average values having the smaller coefficient is determined as the set of average values having the lower evaluation value of the high frequency characteristics.

In this manner, the display area detecting unit 105 determines, between the at least one area R having the set of average values AVD which is previously processed and the area R having the current set of average values MND, an area R having the lowest evaluation value of the high frequency characteristics.

When the current set of average values AVD contains fewer high-frequency components than the set of average values MND, the flow advances to step S112. When the current set of average values AVD contains more high-frequency components than the set of average values MND, the flow advances to step S113.

In step S112, the current set of average values AVD is replaced with the set of average values MND, and offsets of the area R are held as a display position.

As a result, the display area detecting unit 105 uses the set of average values having the lowest evaluation value of the high frequency characteristics which is determined in step S110, as the next set of average values MND in the next step S110.

In step S113, when the display area detecting unit 105 performs, for the area R, spatial frequency comparison in the horizontal direction 132 times, the display area detecting unit 105 sets a horizontal offset of the area R direction to 0, and proceeds to the next step (S114). When the spatial frequency comparison in the horizontal direction is not performed 132 times, the display area detecting unit 105 adds 8 to the horizontal offset, and returns to step S109.

In step S114, the display area detecting unit 105 performs, for the area R, spatial frequency comparison in the vertical direction 115 times, the display area detecting unit 105 sets a vertical offset of the area R to 0, and proceeds to the next step (S115). When the spatial frequency comparison in the vertical direction is not performed 115 times, the display area detecting unit 105 adds 8 to the horizontal offset, and returns to step S108.

As a result, the display area detecting unit 105 determines the set of average values MND after the processes in the last steps S111 and S112, as the set of average values AVD (set of average values MNDX in FIG. 4) of the area R, among all the areas R, which has the lowest evaluation value of the high frequency characteristics.

Here, the area RI (FIG. 3) is the area R of which the set of average values MNDX has the lowest evaluation value of the high frequency characteristics. An area Rm is an area R for which a set of average values MND having the second lowest evaluation value of the high frequency characteristics is calculated. An area Rh is an area R which has the third or subsequent lowest evaluation value of the high frequency characteristics.

An axis frequency of the area RI is the Kax-th highest frequency. Here, an average value of coefficients of the K-th frequency of the area Rm is the same as that of coefficients of the K-th frequency of the area RI, where K satisfies Kax+1≤K≤N. An average value of coefficients of the Kax-th frequency of the area Rm is smaller than that of coefficients of the Kax-th frequency of the area RI. The area RI has, as an average value of coefficients of each of frequencies that is higher than the axis frequency, an average value smaller than average values of coefficients of a frequency in any other area R. In other words, the area RI has, as a component of each frequency higher than the axis frequency, a component smaller than a component of a frequency in any other area R. For this reason, the area RI has, as a representative frequency representing the area RI such as an average frequency of the area RI, a frequency lower than a representative frequency of any other area R.

In step S115, the display area detecting unit 105 outputs, to the drawing control unit 106, the display position of the area R (area RI) detected in step S111, and the processing shown in FIG. 2 ends.

As described above, according to the embodiment, the display area detecting unit 105 detects, in the video signal 132, the area (the area RI) having the lowest spatial frequency. The graphics drawing unit 102 displays the graphics object in the detected area. For this reason, it is possible to display an effective video without superimposing the graphics object on the area which is focused by a camera and has the high spatial frequency such as the area of the object. In short, synthesizing the graphics object onto the area having the high spatial frequency (the representative frequency) is avoided. This avoids synthesizing the graphics object onto the area having a high degree of necessity for a view. Consequently, even though the synthesis target image is synthesized, it is possible to surely enable, even after the synthesis, the view of the image in the area which is included in the image before synthesis and has the high degree of necessity for the view. Moreover, because the video is not reduced to be displayed so that the graphics object is displayed, it is possible to view the video with original resolution. Therefore, it is possible to avoid degrading, by reducing the synthesized synthesis target image to be displayed, image quality of the synthesized synthesis target image, and to maintain the image quality of the synthesized synthesis target image at the high level.

Furthermore, according to the embodiment, the synthesis target image is synthesized onto the area (the area RI) having the low spatial frequency (the representative frequency), and thus the user is allowed to easily distinguish the synthesized synthesis target image from parts (e.g. a background) other than the synthesis target image in the area.

It is to be noted that although the luminance component of the decoded image is divided for each 8-pixel×8-line block and the two-dimensional DCT is performed on each 8-pixel×8-line block in the flowchart shown in FIG. 2, the size of the pixel block is not limited to this.

In the flowchart shown in FIG. 2, the offsets are displaced by the 8 pixels and compared for both of the vertical and horizontal directions so that the position at which the spatial frequency of the area R is lowest is determined. However, the offsets are not limited to the above, and may be integer multiple of a width of a pixel block on which the two-dimensional DCT is performed, for each of the vertical and horizontal directions.

It is to be noted that although the bit stream 131 decoded by the decoding unit 101 is a bit stream compliant with the ISO/IEC 14496-10 in the embodiment, the bit stream 131 may be, for instance, a bit stream compliant with the ISO/IEC 13818-2. Furthermore, although a video size of the bit stream is the HD resolution in the embodiment, resolution is not limited to the HD resolution.

Moreover, although the storage unit 104 is the storage device such as the semiconductor memory element in the embodiment, the storage unit 104 may be a storage device such as a hard disk and a BD (Blu-ray Disc).

Moreover, although the object data 111 is the subtitle data in the embodiment, the object data may be data for drawing an icon, a widget, and so on.

Moreover, although the example where only the subtitle is displayed as the graphics object is described in the embodiment, graphics objects may be displayed simultaneously. In this case, the graphics objects may be prioritized so that the graphics objects are not superimposed on each other. In other words, among the graphics objects, a graphics object having a higher priority level may be displayed in an area in ascending order of a spatial frequency of the area. Furthermore, an area obtained by combining selected graphics objects can be displayed, and the display area detecting unit 105 may detect an area having a low spatial frequency.

Moreover, the graphics object is displayed at the same magnification in the display area detected by the display area detecting unit 105 in the embodiment. However, the display area detecting unit 105 may compare, for the detected display area, a spatial frequency distribution on an 8-pixel×8-line block basis. Based on the comparison result, the display area may be reduced and the offsets of the area and an object size may be outputted so that an area having a relatively high-frequency component is avoided. At the time of reducing the area, a reduction ratio threshold may be defined according to the object size of the selected graphics object.

Moreover, the display area detecting unit 105 detects the display area every time the bit stream is decoded in the embodiment. However, when the detected display area is held in the storage unit and the same bit stream is decoded again, the display area held in the storage unit may be used without using the display area detecting unit 105.

The following describes an image synthesizing device C1 according to the embodiment. The image synthesizing device C1 is to solve the following problem. The problem is that a conventional image synthesizing device merely displays, based on a luminance difference, a subtitle in an area where the subtitle is easily viewable, and even if the area is an object area such as a person, the subtitle is superimposed on the area and displayed, which obstructs a view of the subtitle. In response, the image synthesizing device C1 is an image synthesizing device which decodes an inputted bit stream 131 and synthesizes a graphics object onto a video signal 132 obtained by decoding the bit stream 131. The image synthesizing device C1 includes: a display area detecting unit 105 which analyzes a spatial frequency for each decoded image and detects an area having a low spatial frequency; a drawing control unit 106 which draws the graphics object in the detected area; and so on, and thus is capable of synthesizing the graphics object onto the video signal without superimposing the graphics object on an area having a high spatial frequency such as an object.

The image synthesizing device 1 has the following technical matters. However, the following description is merely an example.

The image synthesizing device 1 includes a synthesizing unit (the image synthesizing unit 103 and a drawing unit 103a), an area determining unit (the display area detecting unit 105), and a control unit (the drawing control unit 106).

The synthesizing unit synthesizes a synthesis target image (the subtitle) onto an area (the area R) of an image before synthesis (the image before synthesis I), to generate an image after synthesis (an image of the video signal 133).

It is to be noted that, here, the image before synthesis is one of images making up a video, that is, each of the images. Furthermore, the image before synthesis is an image focused and captured by a camera.

The area determining unit determines, from among areas (e.g. the area RI and the area Rm) in the image before synthesis, an area (the area RI) having the smallest amplitude of a component of a frequency higher than a predetermined specific frequency (the axis frequency).

The control unit performs control for the synthesizing unit so that the synthesizing unit performs synthesis for the area (the area RI) determined in the synthesis target image by the area determining unit.

Here, the specific frequency (axis frequency) is, among frequencies higher than the specific frequency, a frequency for which a magnitude (an average value of DCT coefficients) of a component of a frequency of the determined area (the area RI) is the same as that of a component of a frequency of another area (another area Rm). In addition, the specific frequency is a frequency for which a magnitude of a component of the specific frequency in the determined area (the area RI) is less than that of a component of the specific frequency in the other area.

The magnitude (the average value of the DCT coefficients) of the component of the frequency in each of the areas (the areas RI and Rm) in the image before synthesis is the following value. The value is an average value of magnitudes (a column average of the DCT coefficients for each of the 15 columns in FIG. 7) of components of frequencies in predetermined parts (pixel blocks B) making up the area.

The magnitude (column average) of the component of the frequency in each part (pixel block B) is the following value. The value is an average value of DCT coefficients F (u, v) (DCT coefficients of a column in question) in terms of a value L (column number) for identifying the frequency, for each pair of u and v where u+v=L.

Moreover, an image synthesizing device 3 (FIG. 10) to be described later has the following technical matters.

The image synthesizing device 3 includes an image determining unit (a counter 321) which determines whether or not an image among images making up a video is an image at the time of a scene change in the video.

The synthesizing unit performs synthesis for each of the images in the video.

When the image determining unit determines that a first image is not the image at the scene change (YES in step S21c), the control unit performs the control so that the synthesizing unit synthesizes the first image onto an area determined for the first image by the area determining unit (step S22).

In contrast, when the image determining unit determines that a second image is the image at the time of the scene change (NO in step S21b and NO in step 21c), the control unit performs the control so that the synthesizing unit synthesizes the second image not onto an area determined for the second image but onto another area.

The image synthesizing device 3 is an example of an image synthesizing device A6 described below.

The image synthesizing device A6 is the image synthesizing device A2. In the image synthesizing device A6, the detecting unit (i) includes a counter (the counter 321), (ii) performs the detecting for each display time, (iii) compares a display position detected at a current display time to a display position detected at the last detection time, (iv) adds an additional value (1) to a value of the counter when a movement distance between the current display position and the last display position is less than a threshold, (v) initializes the value of the counter when the movement distance is equal to or greater than the threshold, (vi) outputs, as a display position at the current display time, the detected current display position when the value of the counter is equal to or greater than a predetermined threshold (6) and the value of the counter specifies that the current time is not an occurrence time of a scene change (YES in step S21c), and (vii) outputs, when the value of the counter is less than the predetermined threshold and specifies that the current time is the occurrence time of the scene change, the last display position at each of display times until the value of the counter becomes equal to or greater than the predetermined threshold, so as to wait for stabilization of a display position of the graphics object.

An image synthesizing device A7 is the image synthesizing device A6, and includes a selection unit (a selection unit 3051) which selects, from among the graphics objects (the object data 111), the graphics object. In the image synthesizing device A7: the object data storage unit holds object data items each of which includes a display time of a graphics object; the selection unit selects, for each display time, a graphics object in a corresponding one of the graphics object data items including a display time; the detecting unit performs, for each display time, the detecting and the outputting; the drawing control unit causes, for each display time, the graphics drawing unit to draw, at the display time, the graphics object selected at the display time by the selection unit at the display position outputted at the display time by the detecting unit; and the image synthesizing unit synthesizes, for each image making up the video and including a display time, the graphics object drawn at the display time by the graphics drawing unit onto the image at the display time of the image.

It is to be noted that the display time here is not a display time of a graphics object but a display time of a video. For example, the detecting unit performs detecting and so on for each display time of a video. The graphics object is displayed at a display time of a video corresponding to the graphics object among display times of videos. Here, a spatial frequency distribution drastically changes at the time of a scene change. Thus, a position determined based on the spatial frequency distribution also drastically changes. In response, it is intended that an object display position is not shifted at the time of the scene change regardless of the change in the spatial frequency distribution. This prevents the object display position from drastically changing at the time of the scene change, and readability of the graphics object can be enhanced.

It is to be noted that a part or a whole of the image synthesizing device 1 may be, for instance, a computer 19 (FIG. 1). The computer 19 includes a CPU (Central Processing Unit) 191, a RAM (Random Access Memory) 192, a ROM (Read Only Memory) 193, and so on.

The computer 19 (CPU 191) may achieve the above functions (the display area detecting unit 105 and so on) by executing a computer program which is stored in, for example, the computer 19 and in which part or all of the functions are described. It is to be noted that the storage unit 104 may be understood as a functional block including at least one of an HDD (Hard Disk Drive), an SDD (Solid State Drive), the RAM 192, the ROM 193, and so on (that is, a storage device 1921) provided in, for instance, the computer 19. In contrast, part or all of the functional blocks which perform processing may be understood as, for example, a functional block including the CPU 101 which executes the processing. The above information processing (calculation (processing) of information) is achieved by the image synthesizing device 1 using those hardware resources (the CPU 191 and the storage device 1921 (the ROM 193 and the RAM 192)). In other words, a collaboration between the computer program in which the information processing is described and the hardware resources such as the CPU 191 realizes an information processing device (the image synthesizing device 1) which executes the information processing in accordance with the intended use and a method of operating the same. It is to be noted that the computer program is stored in, for instance, the storage device 1921.

It is to be noted that a function of each functional block shown in FIG. 1 may be implemented in an integrated circuit. Here, the integrated circuit may be, for example, a so-called single-chip LSI (Large Scale Integration).

It is also to be noted that part or all of the functions of each functional block shown in FIG. 1 may be a function achieved by hardware (wired logic).

(Modification 1)

The following describes an image synthesizing device 2 according to Modification 1 of the embodiment. The image synthesizing device 2 defines, for each type of graphics object, at least one display target area which specifies a display area of an object. Moreover, the image synthesizing device 2 narrows down, for each display time of the graphics object, an area that can be displayed from among the display target areas. It is to be noted that here, for the sake of simplification, a case is described as an example where the image synthesizing device 2 performs synthesis on an image obtained by the decoding unit 101 decoding a bit stream which is recorded in HD resolution (1920 pixels×1080 lines) and compliant with the ISO/IEC 14496-10, as in the case described in the embodiment. The image synthesizing device 2 performs the synthesis on a subtitle as the graphics object.

Figure 8:
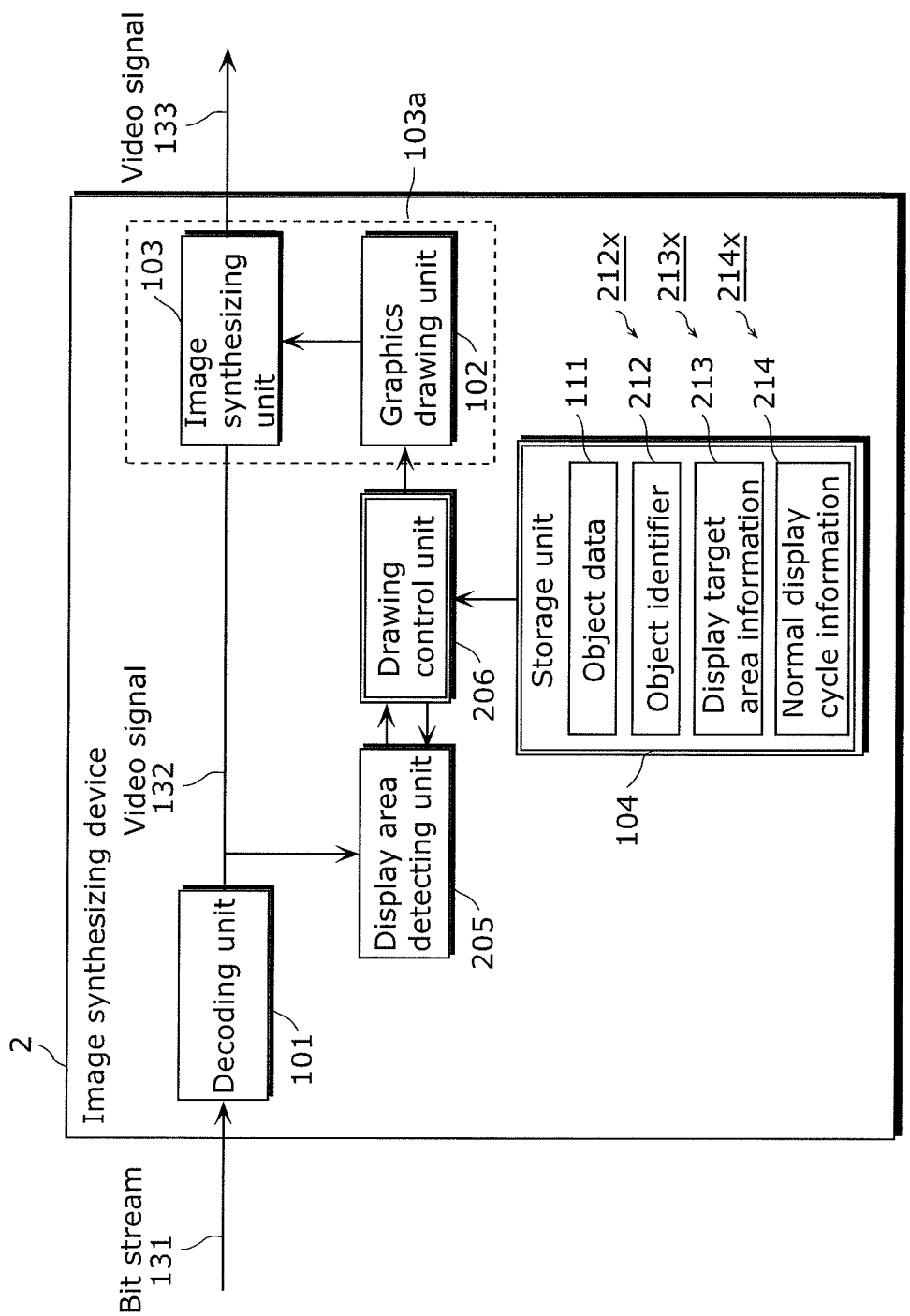
FIG. 8 is a block diagram showing an image synthesizing device according to Modification 1 of the embodiment.

FIG. 8 is a block diagram showing the image synthesizing device 2 according to Modification 1.

Figure 9:
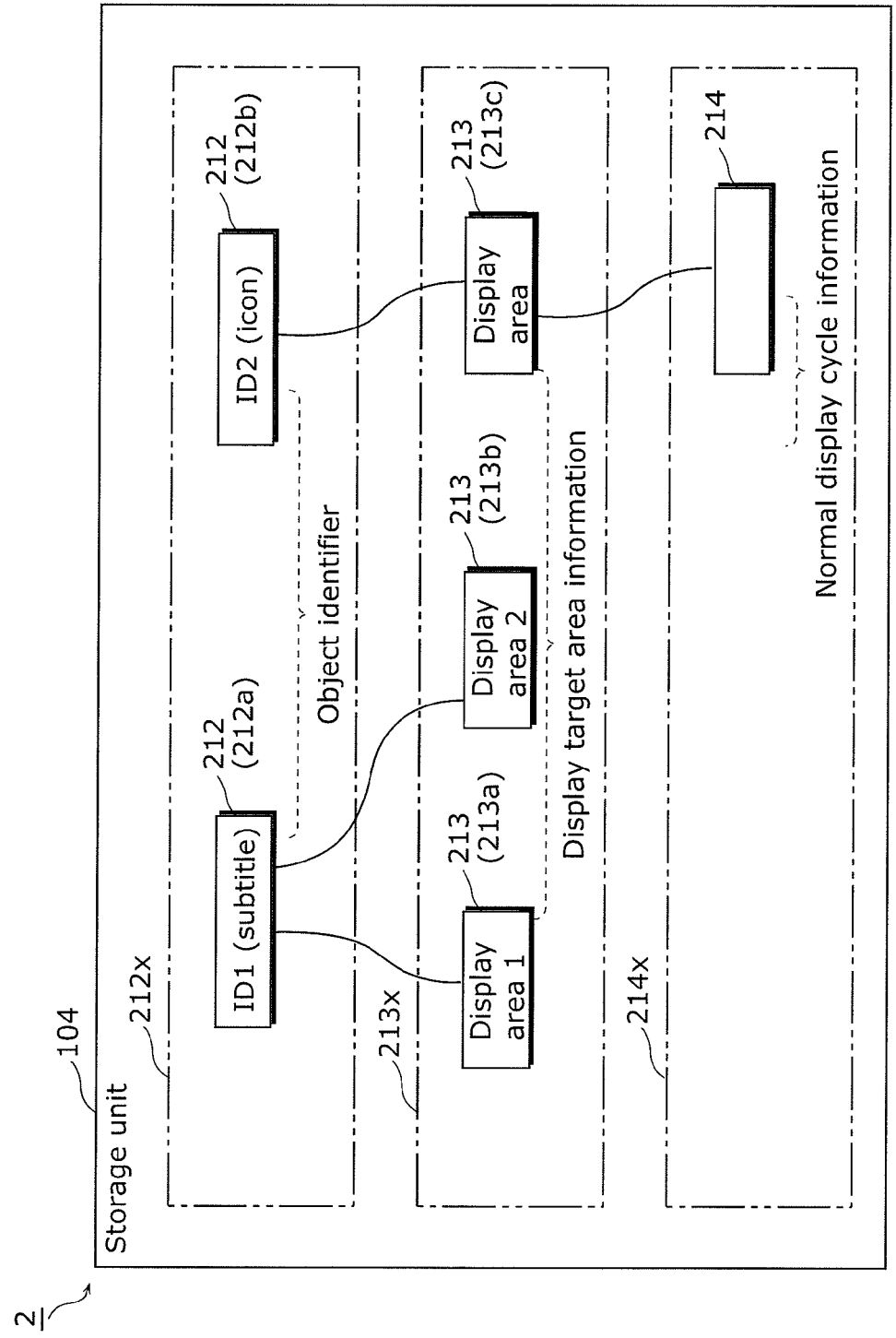
FIG. 9 is a diagram showing an object identifier, display target area information, and normal display cycle information that are stored in a storage unit.

FIG. 9 is a diagram showing an object identifier 212, display target area information 213, and normal display cycle information 214 which are stored in the storage unit 104.

The image synthesizing device 2 decodes the bit stream 131 input from the digital broadcast signal receiving unit, the storage unit or the like, and synthesizes a graphics object onto the decoded video signal 132. The image synthesizing device 2 includes the decoding unit 101, the graphics drawing unit 102, the image synthesizing unit 103, and the storage unit 104. This is the same as in the embodiment. Furthermore, the image synthesizing device 2 includes a display area detecting unit 205 and a drawing control unit 206 in place of the display area detecting unit 105 and the drawing control unit 106. The storage unit 104 holds the object data 111. Although this is the same as in the embodiment, the storage unit 104 further holds the object identifier 212, the display target area information 213, and the normal display cycle information 214. It is to be noted that the reference sign 212x refers to (all of) object identifiers 212, the reference sign 213x refers to (all of) display target area information items 213, and the reference sign 214x refers to (all of) normal display cycle information items 214.

The object identifier 212 is assigned for each type of selectable graphics object (a subtitle, an icon, a widget, and so on). The object identifier 212 identifies one type from among the types. For instance, ID1, ID2, and ID3 are assigned to a subtitle, an icon, and a widget, respectively. The object identifier 212 corresponds to the display target area information 213 and the normal display cycle information 214. For this reason, when the object identifier 212 of ID1 is designated, the drawing control unit 206 specifies, as the display target area information 213 and the normal display cycle information 214 corresponding to the designated object identifier 212, the display target area information 213 and the normal display cycle information 214 for displaying the subtitle that is the type of ID1.

The display target area information 213 specifies the display area of the graphics object, and is information that can be defined for each type of graphics object. The display target area information 213 makes it possible to specify, for each type of graphics object, at least one area as the display area. For example, in the case of subtitles, each of the display target area information items 213 (display target area information 213a, display target area information 213b, and so on in FIG. 9) specifies, as a display target area, a corresponding one of display areas 1 to 4. The display area 1 has pixel offsets (0, 800) and 1920 pixels×280 lines. The display area 2 has pixel offsets (0, 0) and 1920 pixels×280 lines. The display area 3 has pixel offsets (0, 810) and 320 pixels×1080 lines. The display area 4 has the pixel offsets (0, 0) and 320 pixels×1080 lines. It is to be noted that display target area information 213c in FIG. 9 is the display target area information 213 for the icon.

The normal display cycle information 214 defines a display cycle of a graphics object, and is information that can be defined for each type of graphics object. When a graphics object of the normal display cycle information 214 is a graphics object whose display time is not included in the object data 111, the drawing control unit 206 uses the normal display cycle information 214 to calculate the display time. When a type of graphics object is a subtitle, a display time of the subtitle is included in the object data 111, and thus the normal display cycle information 214 is not used. In contrast, when the type is an icon or a widget, a display time of the graphics object is not included in the object data 111 of the graphics object of the type, and thus the drawing control unit 206 calculates the display time based on the normal display cycle information 214 corresponding to the graphics object.

The drawing control unit 206 outputs, to the display area detecting unit 205, a size of a subtitle display area every time an image is decoded by the decoding unit 101, and causes the display area detecting unit 205 to determine a display position of a subtitle. Moreover, the drawing control unit 206 causes the graphics drawing unit 102 to draw the subtitle at the determined display position. This is the same as in the embodiment. Furthermore, the drawing control unit 206 narrows down, for each display time, an area in which a graphics object can be displayed, and thus enhances readability of the graphics object. To put it differently, in order to enhance the readability, the drawing control unit 206 reads out, for each display time, the display target area information 213 corresponding to the subtitle, for instance, each of the display areas 1 to 4 (the display target area information 213a, the display target area information 213b, and so on), from the storage unit 104. Then, the drawing control unit 206 outputs, to the display area detecting unit 205, the display target area information 213, that is, each of the display areas 1 to 4 (the display target area information 213a, the display target area information 213b, and so on), and determines the initial display position from among the display areas 1 to 4. Next, the drawing control unit 206 determines, from among the display areas 1 to 4, a single display target area (the initial display target area) including the determined display position (the initial display position), and causes the display area detecting unit 205 to determine, from among positions included in the determined display target area (the initial display target area), a display position until the next display time.

It is to be noted that the drawing control unit 206 can be normally configured with the MPU, the memory, and so on. A procedure followed by the drawing control unit 206 is normally implemented with the software, and the software is recorded on the recording medium such as the ROM. However, the drawing control unit 206 may be implemented with the hardware (the dedicated circuit).

The display area detecting unit 205 analyzes, for each image decoded by the decoding unit 101, a spatial frequency, detects an area (the area RI) which is suitable for the size of the subtitle display area outputted by the drawing control unit 206 and has the lowest spatial frequency, and outputs a display position of the area to the drawing control unit 206. This is the same as in the embodiment. However, here, the display area detecting unit 205 simultaneously detects, from among display target areas outputted to the display area detecting unit 205 by the drawing control unit 206, a display target area which is suitable for the size of the subtitle display area outputted by the drawing control unit 206 and has the lowest spatial frequency.

It is to be noted that the display area detecting unit 205 can be normally configured with the MPU, the memory, and so on. A procedure followed by the display area detecting unit 205 is normally implemented with the software, and the software is recorded on the recording medium such as the ROM. However, the display area detecting unit 205 may be implemented with the hardware (the dedicated circuit).

As stated above, the detected display target area is used after the display time at the detecting and until a display time next to the display time.

As described above, according to Modification 1, it is possible to specify, for each type of selectable graphics object, the object identifier, the display target area, and the normal display cycle in accordance with characteristics of each graphics object. Furthermore, it is possible to narrow down, for each display time, the area in which the graphics object can be displayed from among the display target areas, and thus to enhance the readability of the graphics object.

It is to be noted that although the example where the types identified by the object identifier 212 are the subtitle, the icon, and the widget is described in Modification 1, the present invention is not limited to the example.

Moreover, although the example where there are the four display areas as the display target areas is described in Modification 1, the number of display areas, the offset of the display area, and the size of the display area are not limited to the example.

Furthermore, although the example where the subtitle is displayed as the graphics object is described in Modification 1, graphics objects may be displayed simultaneously. In this case, a display target area for each graphics object may be determined for each display time so that the display target areas are not superimposed on each other.

(Modification 2)

The following describes an image synthesizing device 3 according to Modification 2 of the embodiment which waits for stabilization of a display position of a graphics object at the time of a scene change. It is to be noted that here, for the sake of simplification, a case is described as an example where the image synthesizing device 3 performs synthesis on an image obtained by the decoding unit 101 decoding a bit stream which is recorded in HD resolution (1920 pixels×1080 lines) and compliant with the ISO/IEC 14496-10, as in the case described in the embodiment. The image synthesizing device 3 performs the synthesis on a subtitle as the graphics object.

Figure 10:
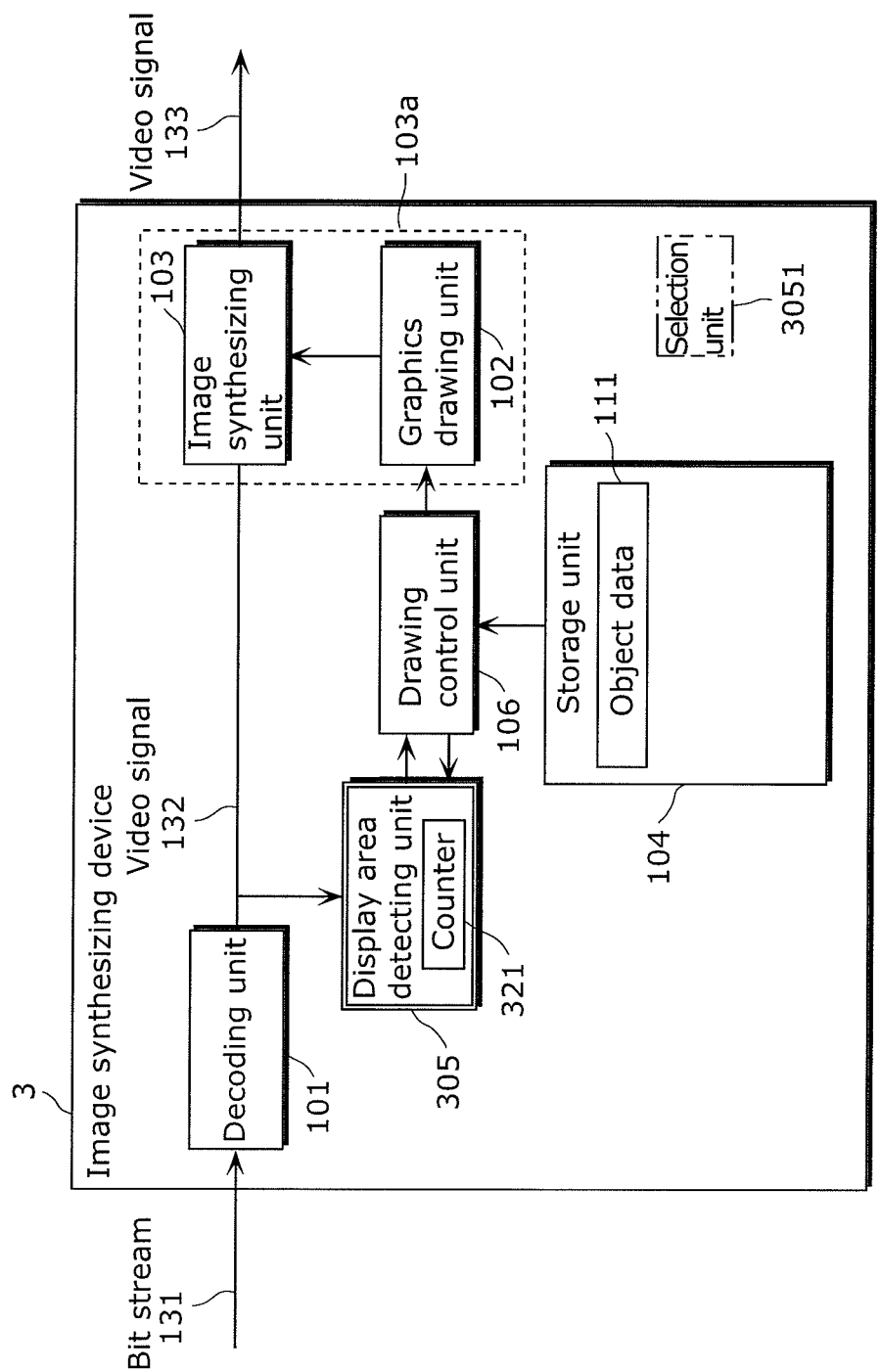
FIG. 10 is a block diagram showing an image synthesizing device according to Modification 2 of the embodiment.

FIG. 10 is a block diagram showing the image synthesizing device 3 according to Modification 2.

The image synthesizing device 3 decodes the bit stream 131 inputted from the digital broadcast signal receiving unit, the storage unit or the like, and synthesizes a graphics object onto the decoded video signal 132. The image synthesizing device 3 includes the decoding unit 101, the graphics drawing unit 102, the image synthesizing unit 103, the storage unit 104, and the drawing control unit 106. This is the same as in the embodiment. Furthermore, the image synthesizing device 3 includes a display area detecting unit 305 in place of the display area detecting unit 105, and the display area detecting unit 305 includes the counter 321.

Figure 11:
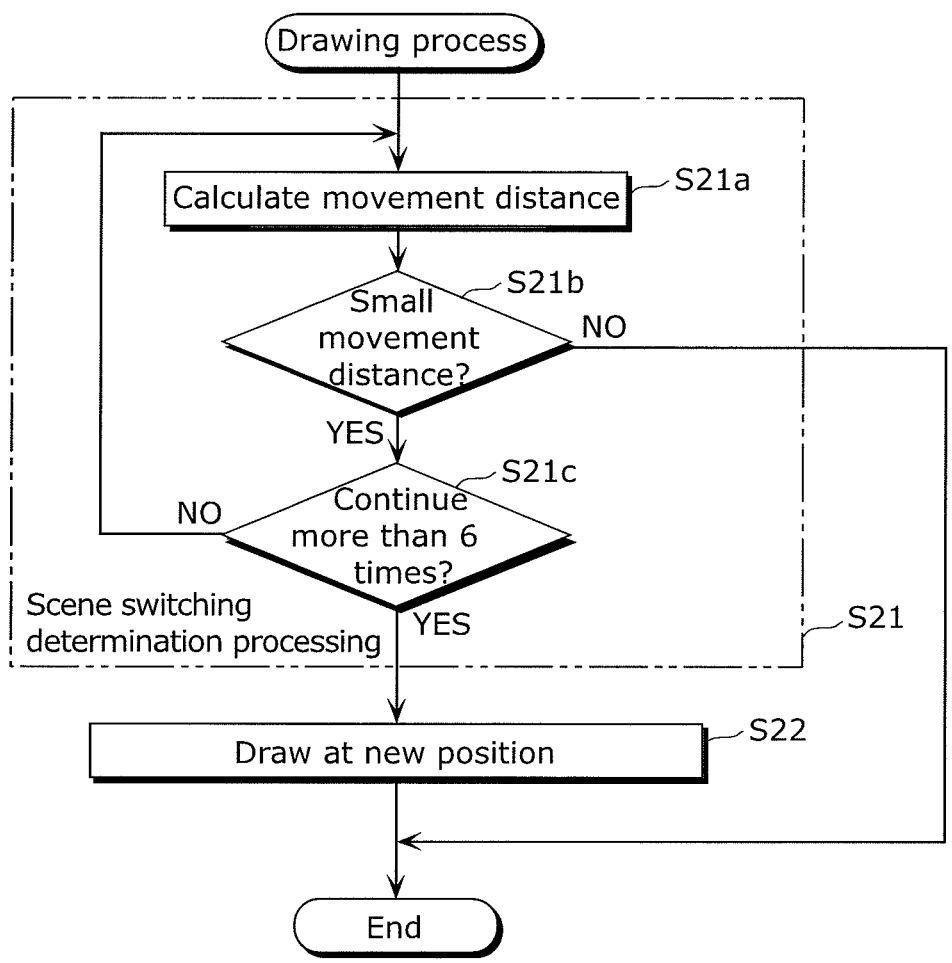
FIG. 11 is a flowchart showing processing performed by the image synthesizing device.

FIG. 11 is a flowchart showing processing performed by the image synthesizing device 3.

The counter 321 is controlled by the display area detecting unit 305. The counter 321 is designed to wait for stabilization of a display position of a graphics object which is caused by change in a spatial frequency distribution accompanied by a scene change in a video. Thus, addition of a value to be held and initialization of the value are appropriately performed for the counter 321. Stated differently, when movement distances in vertical and horizontal directions calculated from a current display position and the last display position which are detected by the display area detecting unit 305 are less than thresholds (YES in step S21b), that is, each of the movement distances is less than the threshold, the display area detecting unit 305 adds an addition value such as value 1 to the value of the counter 321 as the scene change has not occurred. On the other hand, when the movement distances are equal to or greater than the thresholds (NO in step S21), the display area detecting unit 305 initializes the value of the counter 321 to 0 as the scene change has occurred. For instance, assuming that the threshold for the vertical direction is 270 that is ¼ of the number of lines in the vertical direction in the HD resolution and the threshold for the horizontal direction is 480 that is ¼ of the number of pixels in the horizontal direction in the HD resolution, when the movement distance in one of the vertical and horizontal directions is equal to or greater than a corresponding one of the thresholds (NO in step S21b), the value of the counter 321 is initialized to 0 as the scene change has occurred.

The display area detecting unit 305 analyzes, for each image decoded by the decoding unit 101, a spatial frequency, and detects an area (the area RI) which is suitable for a size of a subtitle display area outputted by the drawing control unit 106 and has the lowest spatial frequency. Then, the display area detecting unit 305 outputs, to the drawing control unit 106, a display position of the detected area. This is the same as in the embodiment. Furthermore, the display area detecting unit 305 calculates, from the current display position and the last display position which are detected by the display area detecting unit 305, the movement distance in each of the vertical and horizontal directions (step S21a), initializes the value of the counter 321 to 0 when one of the movement distances is equal to or greater than the threshold (NO in step S21b), and adds 1 to the value of the counter 321 when the one of the movement distances is less than the threshold (YES in step S21b).

Next, the display area detecting unit 305 determines whether or not to output the detected display position to the drawing control unit 106, based on the value of the counter 321 (step S21c). When the value of the counter 321 is equal to or greater than 6 (YES in step S21c), the display area detecting unit 305 stores, as a final display position, the detected display position into the storage unit 104 concurrently with outputting the detected display position to the drawing control unit 106 (step S22). On the other hand, when the value of the counter 321 is less than 6 (NO in step S21c), the display area detecting unit 305 outputs, to the drawing control unit 106, not the detected display position but the last display position stored in the storage unit 104 until the value of the counter 321 becomes equal to or greater than 6. In other words, the synthesis is performed at the detected current display position (the synthesis position) (step S22) when it is determined that the scene change has not occurred (YES in step S21c), and the synthesis is performed not at a new synthesis position but at a previously determined synthesis position when it is determined that the scene change has occurred (NO in step S21b) or when the determination is still in progress and is not yet made (NO in step S21c).

It is to be noted that the display area detecting unit 305 can be normally configured with the MPU, the memory, and so on. A procedure followed by the display area detecting unit 305 is normally implemented with the software, and the software is recorded on the recording medium such as the ROM. However, the display area detecting unit 305 may be implemented with the hardware (the dedicated circuit).

As described above, according to Modification 2, the counter 321 is used to wait for the stabilization of the display position of the graphics object at the time of the change in the spatial frequency distribution accompanied by the scene change. Consequently, it is possible to reduce an increase in the number of times the display position of the graphics object is moved, and thus to enhance the readability of the graphics object.

It is to be noted that although the case where the threshold in the vertical direction is 270 that is ¼ of the number of lines in the vertical direction in the HD resolution and the threshold in the horizontal direction is 480 that is ¼ of the number of pixels in the horizontal direction in the HD resolution is described in Modification 2, the thresholds being for controlling the counter 321, the present invention is not limited to the case.

Moreover, although the display position is updated when the value of the counter 321 is equal to or greater than 6 in Modification 2, a threshold of the counter 321 is not limited to this.

Furthermore, the display position is not updated when the value of the counter 321 is less than 6 in Modification 2. On the other hand, in consideration of a case where a scene change continuously occurs, time-out control may be performed using, for instance, another counter which synchronizes with decode timing and a timer, and a display position may be coercively updated when a time-out occurs.

Moreover, the display area detecting unit 305 analyzes a transition state of an area having a low spatial frequency with reference to a motion vector in the bit stream 131 or by performing frame decoding more early than usual, and predicts transition of the area having the low spatial frequency. Consequently, a movement of a graphics object accompanied by the scene change may be reduced.

Furthermore, although the graphics object is the subtitle in Modification 2, the graphics object may be the icon, the widget, and so on.

(Modification 3)

The following describes an image synthesizing device 4 according to Modification 3 of the embodiment which changes a luminance value of a graphics object based on a luminance difference between the graphics object and a display area of the graphics object. It is to be noted that here, for the sake of simplification, a case is described as an example where the image synthesizing device 4 performs synthesis on an image obtained by the decoding unit 101 decoding a bit stream which is recorded in HD resolution (1920 pixels×1080 lines) and compliant with the ISO/IEC 14496-10, as in the case described in the embodiment. The image synthesizing device 4 performs the synthesis on a subtitle as the graphics object.

Figure 12:
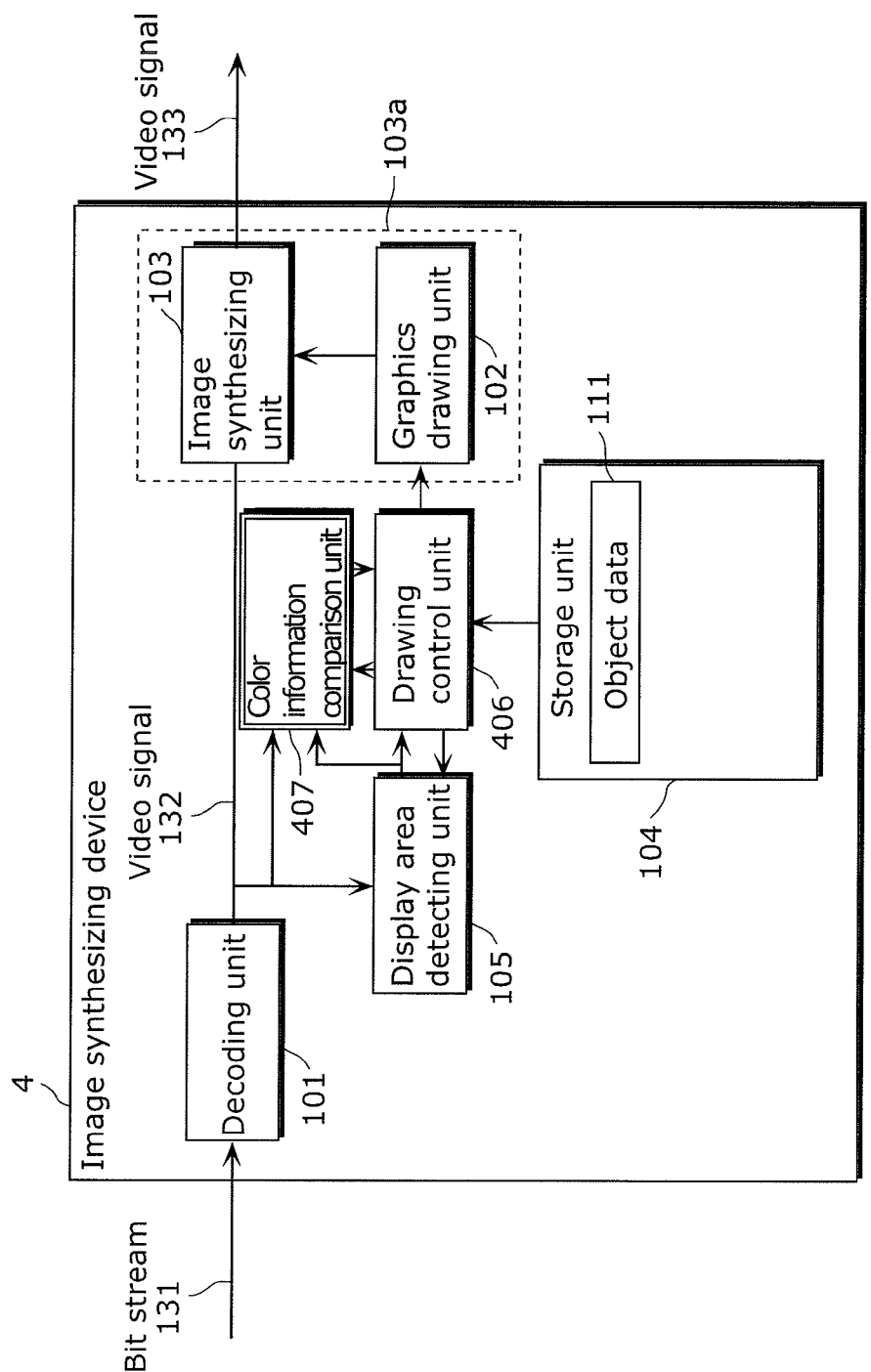
FIG. 12 is a block diagram showing an image synthesizing device according to Modification 3 of the embodiment.

FIG. 12 is a block diagram showing the image synthesizing device 4 according to Modification 3.

The image synthesizing device 4 decodes the bit stream 131 inputted from the digital broadcast signal receiving unit, the storage unit or the like, and synthesizes a graphics object onto the decoded video signal 132. The image synthesizing device 4 includes the decoding unit 101, the graphics drawing unit 102, the image synthesizing unit 103, the storage unit 104, and the display area detecting unit 105. This is the same as in the embodiment. Furthermore, the image synthesizing device 4 includes a drawing control unit 406 in place of the drawing control unit 106, and further includes a color information comparison unit 407.

Figure 13:
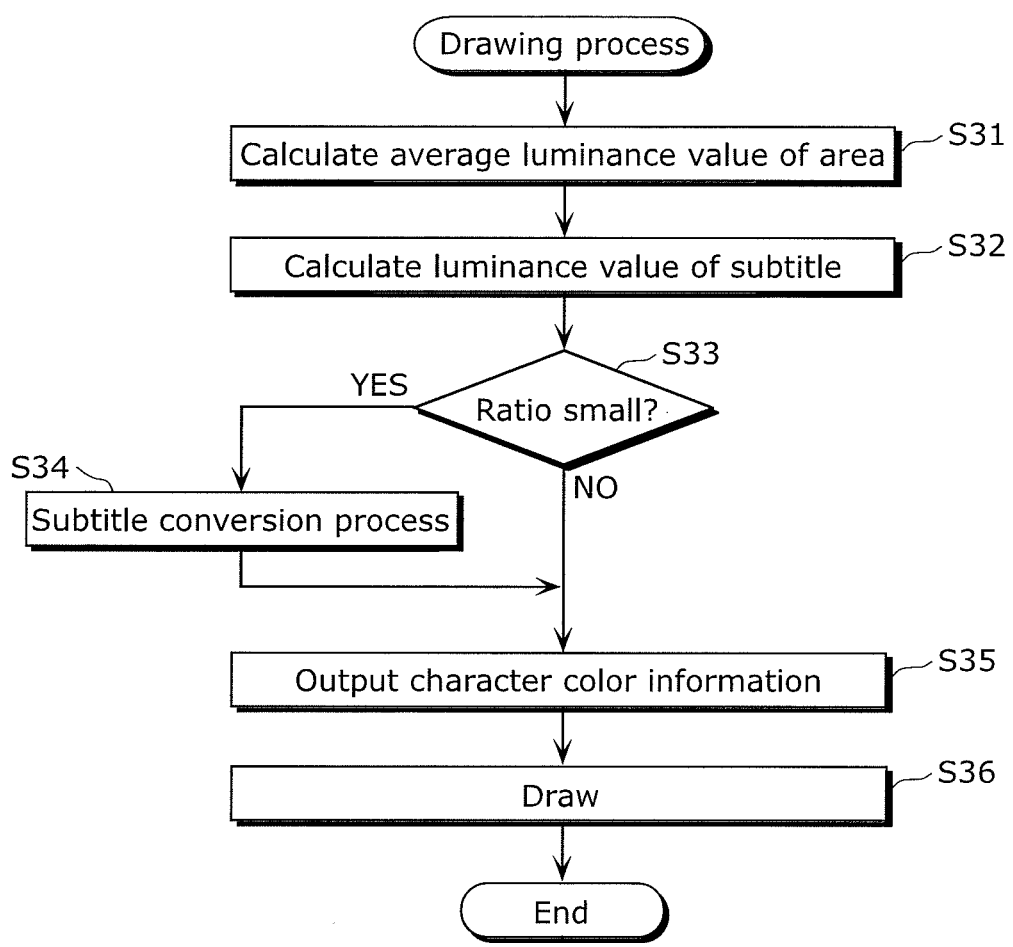
FIG. 13 is a flowchart showing processing performed by the image synthesizing device.

FIG. 13 is a flowchart showing processing performed by the image synthesizing device 4.

The color information comparison unit 407 calculates an average luminance value based on a size of a subtitle display area outputted from the drawing control unit 406 and a display position outputted from the display area detecting unit 105 (step S31). More specifically, the color information comparison unit 407 calculates an average luminance value of an area (the area RI) having a size of a subtitle display area and at a display position in an image decoded by the decoding unit 101, based on the size of the subtitle display area and the display position.

In the meantime, the color information comparison unit 407 extracts, via the drawing control unit 406, font color information of a subtitle from the object data 111 of the subtitle stored in the storage unit 104, and calculates a luminance value of the subtitle specified by the extracted font color information (step S32). For instance, when a font color of the subtitle is determined by RGB, the color information comparison unit 407 calculates the luminance value based on the ITU-R BT. 709. Next, the color information comparison unit 407 compares the average luminance value calculated based on the display area of the graphics object (step S31) to the average luminance value calculated based on the font color of the subtitle (step S32) (step S33), and converts a luminance component of the font color of the subtitle so that a luminance ratio becomes greater than a predetermined threshold (e.g. 2), when the luminance ratio is equal to or less than the predetermined threshold (2) (step S34). After the conversion, the color information comparison unit 407 outputs font color information to the drawing control unit 406 (step S35). On the other hand, when the luminance ratio is greater than 2 (NO in step S33), the color information comparison unit 407 outputs, to the drawing control unit 406, the color font information of the subtitle that is the same as the color font information extracted from the object data 111 of the subtitle (step S35).

It is to be noted that the color information comparison unit 407 can be normally configured with the MPU, the memory, and so on. A procedure followed by the color information comparison unit 407 is normally implemented with the software, and the software is recorded on the recording medium such as the ROM. However, the color information comparison unit 407 may be implemented with the hardware (the dedicated circuit).

The drawing control unit 406 outputs, to the display area detecting unit 105, a size of a subtitle display area every time an image is decoded by the decoding unit 101, determines a display position of a subtitle, and causes the graphics drawing unit 102 to draw the subtitle at the display position. This is the same as in the embodiment. Furthermore, the drawing control unit 406 causes the graphics drawing unit 102 to draw the subtitle with the font color specified in the font color information of the subtitle outputted from the color information comparison unit 407 (step S35) (step S36).

It is to be noted that the drawing control unit 206 can be normally configured with the MPU, the memory, and so on. A procedure followed by the drawing control unit 206 is normally implemented with the software, and the software is recorded on the recording medium such as the ROM. However, the drawing control unit 206 may be implemented with the hardware (the dedicated circuit).

As described above, according to Modification 3, the processing is performed depending on whether or not the luminance difference is equal to or less than the threshold (step S33). Here, the luminance difference is between the average luminance value of the decoded image corresponding to the display area of the graphics object detected by the display area detecting unit 105 (step S31) and the average luminance value of the graphics object to be drawn (step S32). To put it differently, when the luminance difference is equal to or less than the threshold (YES in step S33), the color information comparison unit 407 changes the luminance value of the graphics object so that the luminance difference becomes greater than the threshold. This process (step S34) allows the graphics object to be displayed in the area (the area RI) having the lowest spatial frequency in the video. As a result, it is possible to enhance the visibility of the graphics object.

It is to be noted that although the luminance value is calculated from RGB in accordance with the ITU-R BT. 709 in Modification 3, a method of calculating a luminance value is not limited to this. For instance, in the case of SD resolution, a luminance value can be calculated from RGB based on the ITU-R BT. 601.

Moreover, although the color information comparison unit 407 evaluates a visibility of the graphics object based on the luminance ratio (step S33) in Modification 3, the visibility may be evaluated based on the luminance difference.

Furthermore, although the threshold for the luminance ratio which makes the graphics object viewable is 2 in Modification 3, the threshold is not limited to this.

Moreover, although the luminance value is used to enhance the visibility of the graphics object in Modification 3, the visibility of the graphics object may be ensured by using a combination of the luminance value and a chrominance value. In addition, in stead of the luminance value, the chrominance value may be used to ensure the visibility of the graphics object.

Furthermore, although the font color of the subtitle is changed by changing the luminance value of the graphics object so that the luminance ratio becomes greater than the threshold in Modification 3, another font color which allows the luminance ratio to be greater than the threshold may be selected.

Moreover, the color information comparison unit 407 changes the display color of the selected graphics object so that the luminance ratio is increased (step S34) in Modification 3. On the other hand, the color information comparison unit 407 may change a luminance value of a video signal corresponding to a display area of a graphics object detected by the display area detecting unit 105.

Furthermore, the color information comparison unit 407 changes the luminance value of the graphics object so that the luminance ratio becomes greater than the threshold in Modification 3. Consequently, the font color of the subtitle is changed (step S34). On the other hand, the color information comparison unit 407 may change a degree of transparency (a value) of the graphics object or a degree of transparency (a value) of the video signal corresponding to the display area of the graphics object detected by the display area detecting unit 105 so that the luminance ratio becomes greater than the threshold.

Moreover, the average luminance value of the display area is used as the luminance value of the display area of the graphics object in Modification 3. When the luminance value varies widely, there is a case where an area having low visibility is created. To prevent the visibility from being reduced due to the variation in the luminance value, a display area may be divided into blocks, and a luminance value may be evaluated and changed for each divided block.

Furthermore, although the average luminance value of the display area is used as the luminance value of the display area of the graphics object in Modification 3, an average luminance value obtained by thinning out luminance values of the whole display area or a median in a luminance distribution of the display area may be used so as to reduce throughput.

Moreover, although the luminance value of the selected graphics object is evaluated and is changed based on the evaluation result every time the image is decoded in Modification 3, timing at which the luminance value is changed is not limited to this. The luminance value may be evaluated and changed for each display time of the graphics object, for each scene change, or at regular time intervals.

Furthermore, although the graphics object is the subtitle in Modification 3, the graphics object may be the icon, the widget, and so on.

(Modification 4)

The following describes an image coding device 5 according to Modification 4 of the embodiment which determines, for each type of graphics object, a display area, and encodes the determined display area as display information. In addition, the following describes an image synthesizing device 6 according to Modification 4 which obtains, from the coded graphics object display information, display area information corresponding to a selected graphics object, and synthesizes the graphics object onto the display area. In other words, the following describes an image processing system 6s according to Modification 4 which includes the image coding device 5 and the image synthesizing device 6.

It is to be noted that, here, for the sake of simplification, a case is described where the image coding device 5 is provided in a BD recorder. The image coding device 5 detects, for a mobile terminal, respective display areas for a subtitle, a widget, and an icon in a video in VGA resolution (640 pixels× 480 lines). The image coding device 5 encodes, as display information, the display areas into a bit stream compliant with the ISO/IEC 14496-10. In contrast, a case is described where the image synthesizing device 6 provided in the mobile terminal decodes the bit stream coded by the image coding device 5, obtains display area information corresponding to a selected widget, and synthesizes the widget onto an image obtained by the decoding.

Figure 14:
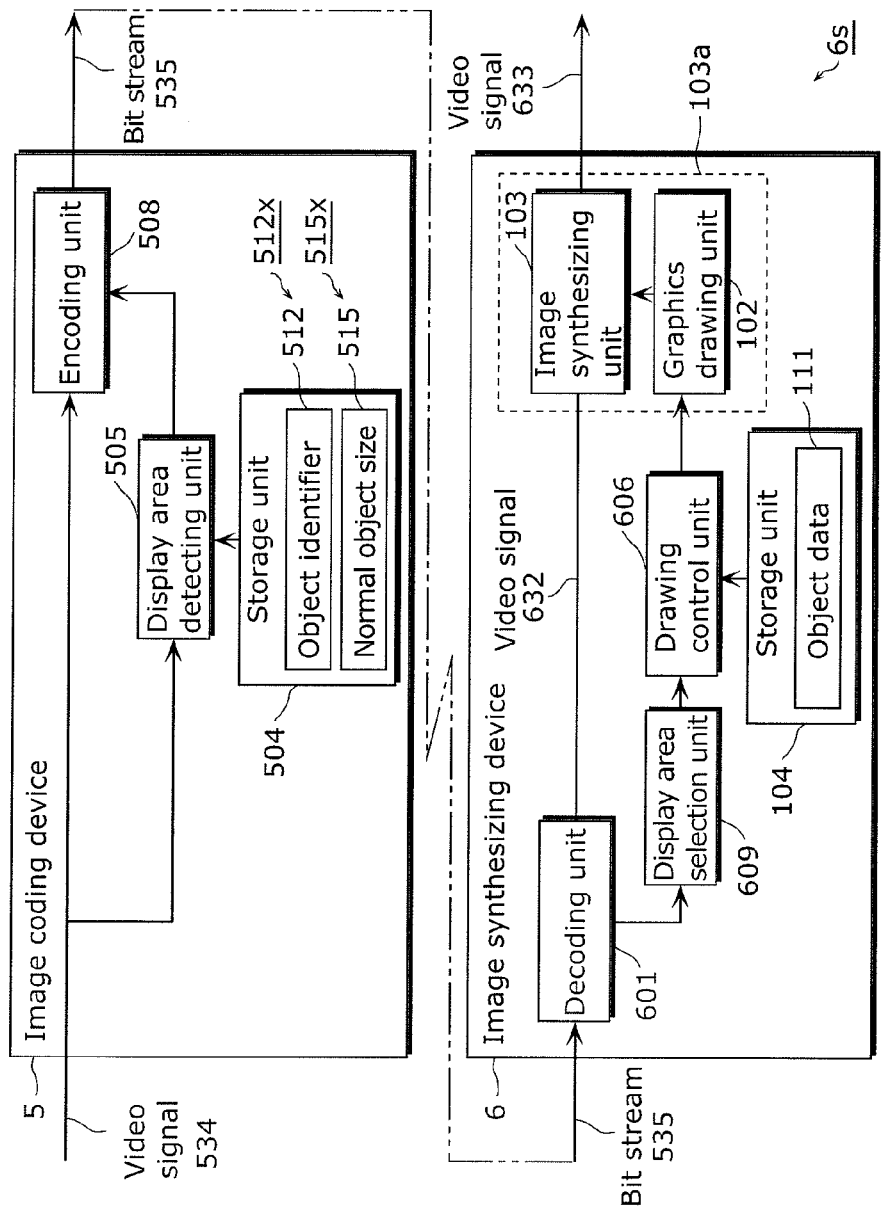
FIG. 14 is a block diagram showing an image coding device and an image synthesizing device according to Modification 4 of the embodiment.

FIG. 14 is a block diagram showing the image coding device 5 and the image synthesizing device 6 according to Modification 4.

First, the following describes the image coding device 5 according to Modification 4.

The image coding device 5 is an image coding device which encodes, as a bit stream 535 compliant with the ISO/IEC 14496-10, a video signal 534 inputted thereto from a decoding unit or a storage unit. The image coding device 5 includes an encoding unit 508, a storage unit 504, and a display area detecting unit 505. The storage unit 504 includes an object identifier 512 and a normal object size 515.

Like the storage unit 104 described in the embodiment, the storage unit 504 is a storage device such as a semiconductor memory element.

The object identifier 512 is assigned for each type of graphics object selectable by the mobile terminal (see the object identifier 212 in FIG. 8). For instance, ID10, ID12, and ID13 are assigned to a subtitle, an icon, and a widget, respectively. The object identifier 512 corresponds to the normal object size 515. For this reason, when the object identifier 512 of ID10 is designated, the display area detecting unit 505 determines, as the normal object size 515 corresponding to the object identifier 512, the normal object size 515 for displaying the subtitle. The determination is made from among normal object sizes 515.

The normal object size 515 is information which specifies a normal size of a graphics object that can be displayed on the mobile terminal, and information that can be defined for each type of graphics object. For example, sizes of a subtitle, an icon, and a widget are specified as 280 pixels×40 lines, 32 pixels×32 lines, and 120 pixels×96 lines, respectively, by normal object sizes 515 of the corresponding types.

It is to be noted that the reference sign 512x refers to (all of) the object identifiers 512, and the reference sign 515x refers to (all of) the normal object sizes 515.

The encoding unit 508 encodes the video signal 534 in the VGA resolution which is inputted to the image coding device 5, into the bit stream 535 compliant with the ISO/IEC 14496-10, and outputs data obtained by the encoding. Moreover, the encoding unit 508 encodes, for each image, respective display information for displaying the subtitle, the widget, and the icon outputted by the display area detecting unit 505, into User Data Unregistered SEI. Here, the display information is data composed of an object identifier, a display position, and an object size.

Figure 15:
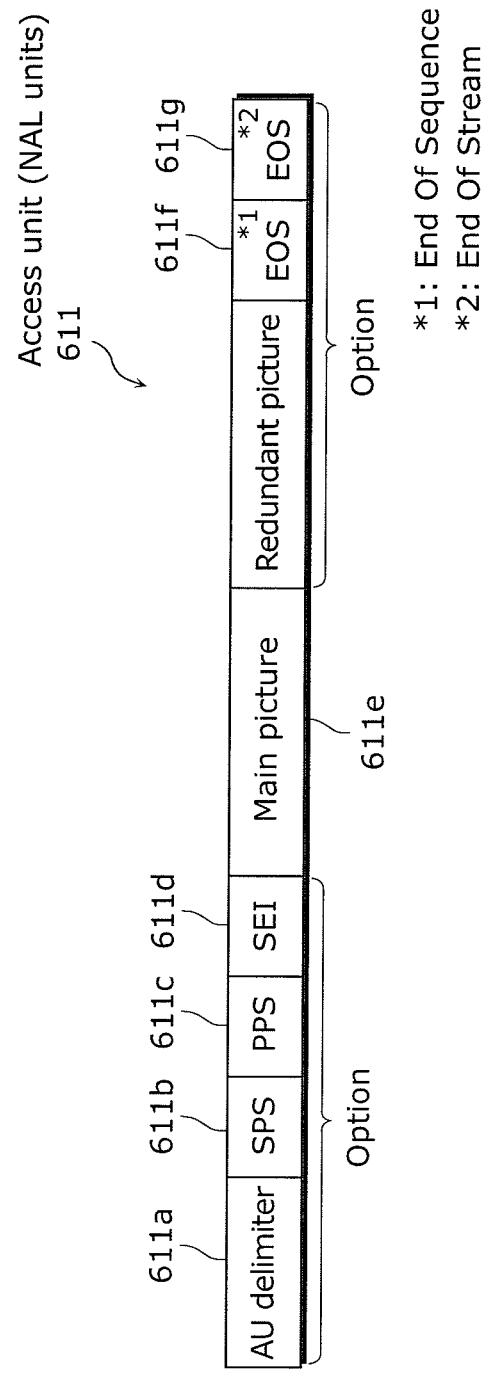
FIG. 15 is a diagram showing a NAL structure of a bit stream in Modification 4.

FIG. 15 is a diagram showing a structure of the bit stream 535 outputted by the encoding unit 508, based on NAL (Network Abstraction Layer) units defined by the ISO/IEC 14496-10. FIG. 15 shows an example where the bit stream 535 includes, as the NAL units, SEI (Supplemental Enhancement Information) 611d, a SPS (Sequence Parameter Set) 611b, a PPS (Picture Parameter Set) 611c, an AU (Access Unit) delimiter 611a, an EOS (End Of Sequence) 611g, an EOS (End Of Stream) 611f, a slice (coded picture) 611e, and so on. It is to be noted that it is assumed in Modification 4 that the User Data Unregistered SEI which is the SEI 611d in which at least the AU delimiter 611a and any user data can be described is always given for each coded picture.

FIG. 16 is a syntax table 6T showing a structure of the User Data Unregistered SEI outputted by the encoding unit 508. Here, syntaxes are shown based on the notation of C language used as a program description language of, for instance, a computer device.

The User Data Unregistered SEI shown in FIG. 16 is data in which a payload size as indicated by user_data_unregistered (payloadSize) in the first row of the table 6T, that is, a data length of the whole User Data Unregistered SEI is designated. Identification information which allows unique identification is stored in a field having the data length of 128 bits, uuid_iso_iec_11578, in the next row. A field having the data length of 8 bits, number_of_graphics_object_type_entries, indicates the number of types of graphics object defined in the picture. As many display information items as indicated by number_of_graphics_object_type_entries are stored according to the next for loop statement.

The following describes a field corresponding to the display information. A field having the data length of 8 bits, graphics_object_type_id, is an object identifier, fields having the data length of 16 bits, offset_x and offset_y, indicate a display position, and lastly fields having the data length of 16 bits, width_size and height_size, indicate an object size.

In Modification 4, three display information items of the subtitle, the icon, and the widget are stored in the User Data Unregistered SEI, and thus number_of_graphics_object_type_entries is 3. Moreover, graphics_object_type_id of the display information corresponding to the subtitle is ID10 (the numeral 10), offset_x and offset_y indicate (0, 0), and width_size and height_size indicate 280 pixels×48 lines. It is to be noted that in this case, payloadSize indicates 44 bytes.

It is to be noted that, here, the output of the bit stream 535 is a concept including transmission of the bit stream 535 by the image coding device 5 to an external device outside of the image coding device 5 and accumulation of the bit stream 535 by the image coding device 5 into a recording medium.

The encoding unit 508 can be normally configured with the MPU, the memory, and so on. A procedure followed by the encoding unit 508 is normally implemented with the software, and the software is recorded on the recording medium such as the ROM. However, the encoding unit 508 may be implemented with the hardware (the dedicated circuit).

The display area detecting unit 505 analyzes a spatial frequency for each image inputted to the image coding device 5, and detects an area (the area RI) which is suitable for the normal object size 515 and has the lowest spatial frequency. This is the same as in the embodiment. In Modification 4, there are the respective normal object sizes 515 for the subtitle, the icon, and the widget. For this reason, the display area detecting unit 505 sequentially reads out the normal object sizes 515 from the storage unit 504, detects a display area corresponding to each of the graphics objects, and outputs the respective display information for the subtitle, the icon, and the widget. Here, each outputted display information is composed of the detected (determined) display position and the read normal object size 515.

It is to be noted that the display area detecting unit 505 can be normally configured with the MPU, the memory, and so on. A procedure followed by the display area detecting unit 505 is normally implemented with the software, and the software is recorded on the recording medium such as the ROM. However, the display area detecting unit 505 may be implemented with the hardware (the dedicated circuit).

Next, the following describes the image synthesizing device 6 according to Modification 4.

The image synthesizing device 6 receives the bit stream 535 outputted from the image coding device 5, decodes the received bit stream 535, synthesizes a selected graphics object onto a video signal 632 obtained by the decoding, and displays the synthesized graphics object. The image synthesizing device 6 includes the graphics drawing unit 102, the image synthesizing unit 103, and the storage unit 104. This is the same as in the embodiment. Furthermore, instead of the decoding unit 101, the display area detecting unit 105, and the drawing control unit 106, the image synthesizing device 6 includes a decoding unit 601, a display area selection unit 609, and a drawing control unit 606.

The decoding unit 601 decodes a bit stream (the bit stream 535) compliant with the ISO/IEC 14496-10. Although this is the same as in the embodiment, the decoding unit 601 further obtains, from User Data Unregistered SEI in the bit stream, respective display information for a subtitle, an icon, and a widget, and outputs the display information.

The display area selection unit 609 selects, from among the respective display information for the subtitle, the icon, and the widget outputted from the decoding unit 601, the display information corresponding to the selected widget, based on an object identifier. Then, the display area selection unit 609 outputs, to the drawing control unit 606, the display position and the object size included in the selected display information.

It is to be noted that the display area selection unit 609 can be normally configured with the MPU, the memory, and so on. A procedure followed by the display area selection unit 609 is normally implemented with the software, and the software is recorded on the recording medium such as the ROM. However, the display area selection unit 609 may be implemented with the hardware (the dedicated circuit).

The drawing control unit 606 draws the widget at the display position inputted from the display area selection unit 609 every time the image is decoded by the decoding unit 601. This is the same as in the embodiment. The drawing control unit 606 further causes the graphics drawing unit 102 to expand or reduce the widget based on the object size inputted from the display area selection unit 609, and to draw the expanded or reduced widget.

It is to be noted that the drawing control unit 606 can be normally configured with the MPU, the memory, and so on. A procedure followed by the drawing control unit 606 is normally implemented with the software, and the software is recorded on the recording medium such as the ROM. However, the drawing control unit 606 may be implemented with the hardware (the dedicated circuit).

As described above, in Modification 4, when the mobile terminal reproduces content transcoded from, for example, the BD recorder, the BD recorder encodes in advance, as the bit stream, the display information for the graphics object selectable by the mobile terminal, together with the inputted video. As a result, the mobile terminal which decodes the bit stream makes it possible to synthesize the graphics object selected by the user onto the decoded video and display the synthesized graphics object with low power consumption and in an effective manner.

It is to be noted that although the case where the bit stream 535 compliant with the ISO/IEC 14496-10 is used is described in Modification 4, the present invention is not limited to the case. A bit stream compliant with the ISO/IEC 13818-2 or the like may be used.

Moreover, although the example where the image coding device 5 and the image synthesizing device 6 are provided in the BD recorder and the mobile terminal, respectively, is described in Modification 4, both the image coding device 5 and the image synthesizing device 6 may be provided in a single device such as the BD recorder.

Furthermore, although the example where the object identifier, the display position, and the object size are used as parameters to be encoded in the bit stream 535 is described in Modification 4, the present invention is not limited to the example.

Moreover, although the example where the single normal object size 515 is defined for each type of graphics object such as the subtitle, the icon, and the widget in Modification 4, one or more normal object sizes 515 may be defined for each type of graphics object. For instance, when one or more icons are displayed in combination, the normal object size 515 may be defined according to the number of icons to be displayed.

Furthermore, the display area detecting unit 505 detects, for each type of graphics object such as the subtitle, the icon, and the widget, the single display area in Modification 4. However, assuming that graphics objects such as the subtitle and the widget are displayed simultaneously, one or more display areas may be detected.

Moreover, although the display area detecting unit 505 detects, for each type of graphics object such as the subtitle, the icon, and the widget, the single display area in Modification 4, the one or more display areas may be detected when, for example, widgets are displayed dispersedly.

Furthermore, although the image coding device 5 performs encoding on the assumption that the image coding device 5 is provided in the mobile terminal in Modification 4, the assumed application is not limited to this.

Moreover, although the example where the widget is displayed as the graphics object is described in Modification 4, graphics objects may be displayed simultaneously. In this case, the graphics objects may be prioritized so that the graphics objects are not superimposed on each other, and a graphics object having a higher priority level may be displayed in an area in ascending order of a spatial frequency of the area.

(Modification 5)

The following describes an image coding device 7 according to Modification 5 of the embodiment which selects a graphics object based on a result of analysis of a video signal, and encodes display information of the selected graphics object. In addition, the following describes an image synthesizing device 8 according to Modification 5 which performs synthesis on a graphics object based on coded object display information. In other words, the following describes an image processing system 8s according to Modification 5 which includes the image coding device 7 and the image synthesizing device 8. It is to be noted that, here, for the sake of simplification, an example is described where the image coding device 7 processes a video signal in HD resolution (1920 pixels×1080 lines). To put it differently, the image coding device 7 determines a display area for displaying a balloon (a balloon 806Ib) at a position of a mouth of a speaker (a position of an image of a mouth 806Ia in FIG. 18) which is detected as an amount of characteristic from the video signal. Then, the image coding device 7 encodes, as display information, the determined display area in a bit stream compliant with the ISO/IEC 14496-10. In contrast, the image synthesizing device 8 synthesizes the selected balloon onto the video signal based on the display information obtained by decoding the bit stream coded by the image coding device 7 so that the balloon object is displayed.

Figure 17:
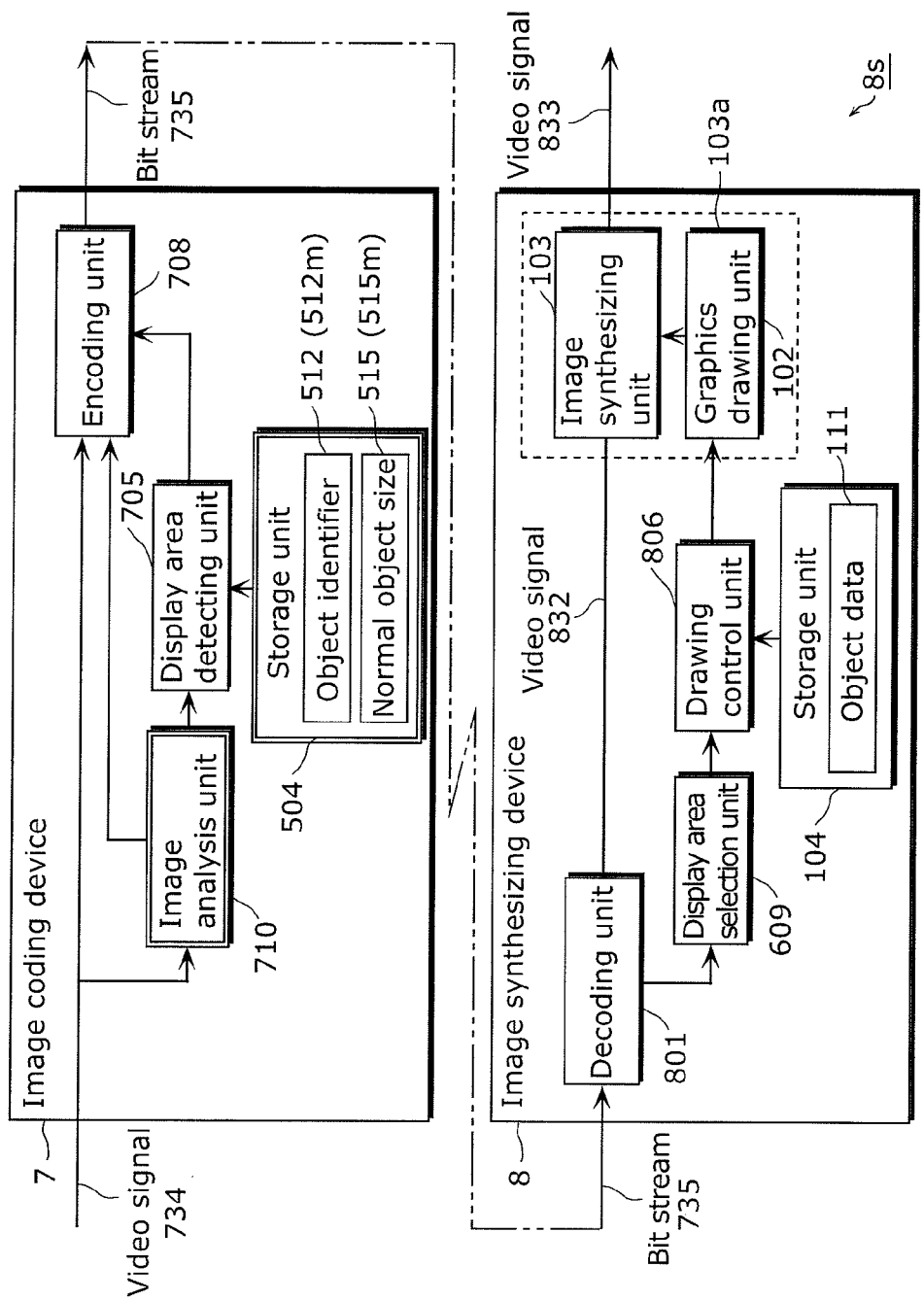
FIG. 17 is a block diagram showing an image coding device and an image synthesizing device according to Modification 5 of the embodiment.

FIG. 17 is a block diagram showing the image coding device 7 and the image synthesizing device 8 according to Modification 5.

Figure 18:
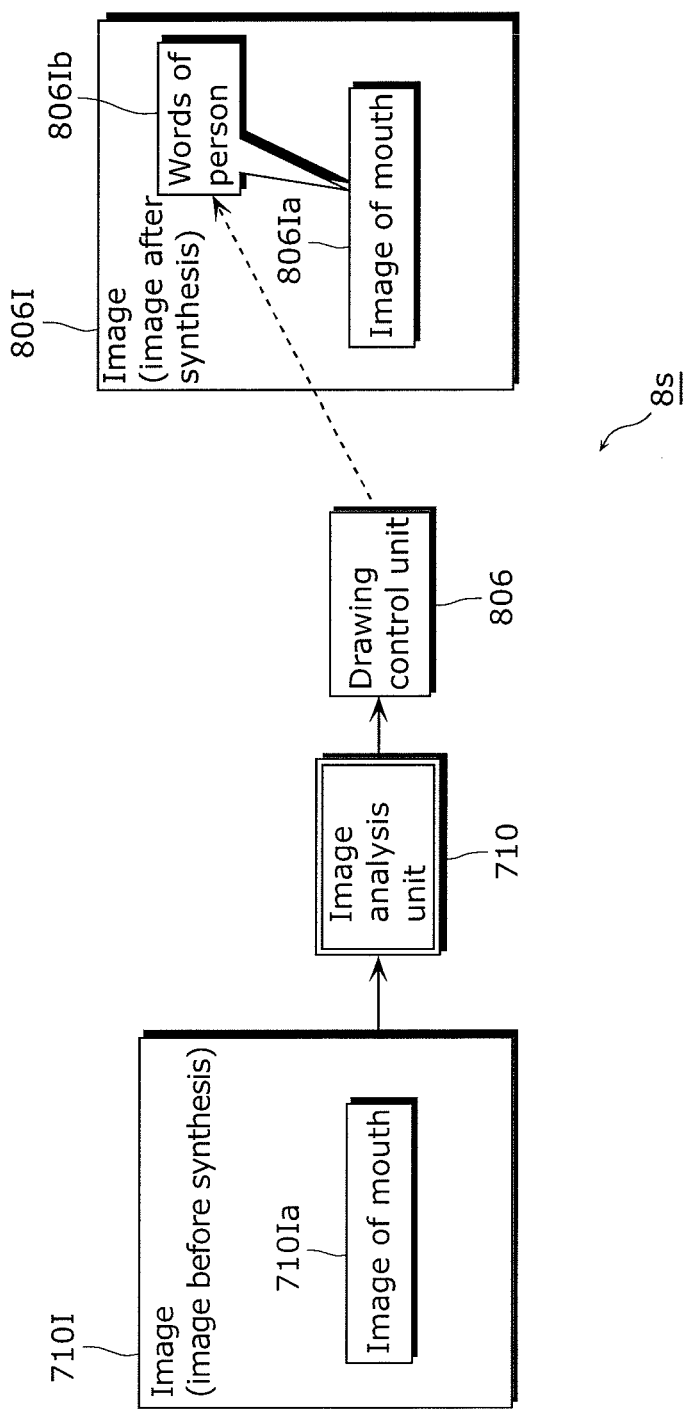
FIG. 18 is a diagram showing an image before synthesis and an image after synthesis in an image processing system.
Figure 19:
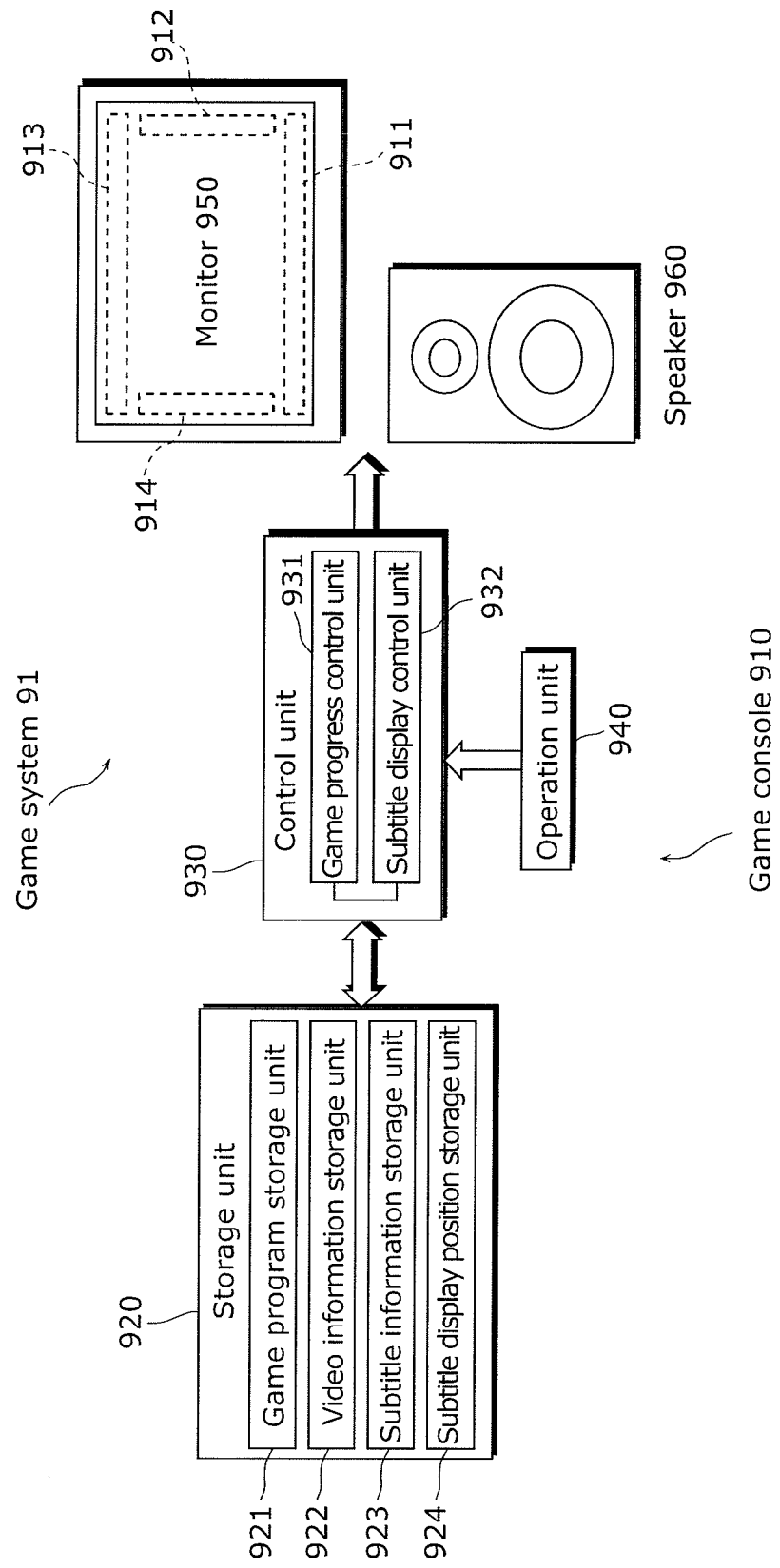
FIG. 19 is a block diagram showing a conventional image synthesizing device.

FIG. 18 is a diagram showing an image before synthesis 7101 and an image after synthesis 8061 in the image processing system 8s.

First, the following describes the image coding device 7 according to Modification 5.

The image coding device 7 encodes, as a bit stream 735 compliant with the ISO/IEC 14496-10, a video signal 734 inputted from a decoding unit or a storage unit. The image coding device 7 includes the storage unit 504. This is the same as in Modification 4. Moreover, the image coding device 7 includes a display area detecting unit 705 and an encoding unit 708 in place of the display area detecting unit 505 and the encoding unit 508, and further includes an image analysis unit 710.

The image analysis unit 710 analyzes the inputted video signal 734, detects, as an amount of characteristic indicating characteristics of the video signal 734, a position of a mouth of a speaker (an image of a mouth 710Ia) in an image indicated by the video signal 734, and outputs, to the encoding unit 708, a time of the detection as a display time together with the detected position of the mouth of the speaker. Moreover, when the image analysis unit 710 detects the position of the mouth of the speaker, the image analysis unit 710 outputs, as a graphics object suitable for display, an object identifier 512m (FIG. 17) corresponding to a balloon among object identifiers 512.

It is to be noted that the image analysis unit 710 can be normally configured with the MPU, the memory, and so on. A procedure followed by the image analysis unit 710 is normally implemented with the software, and the software is recorded on the recording medium such as the ROM. However, the image analysis unit 710 may be implemented with the hardware (the dedicated circuit).

The display area detecting unit 705 analyzes a spatial frequency for each inputted image, and detects an area (the area RI) which is suitable for the normal object size 515 and has the lowest spatial frequency. This is the same as in Modification 4. In contrast, the display area detecting unit 705 reads out, from the storage unit 504, the normal object size 515m for the balloon based on the object identifier (the object identifier 512m for the balloon) inputted from the image analysis unit 710. Then, the display area detecting unit 705 detects a display area, and outputs, to the encoding unit 708, the object identifier 512m, the display position, and the normal object size 515m for balloon.

It is to be noted that the display area detecting unit 505 can be normally configured with the MPU, the memory, and so on. A procedure followed by the display area detecting unit 505 is normally implemented with the software, and the software is recorded on the recording medium such as the ROM. However, the display area detecting unit 505 may be implemented with the hardware (the dedicated circuit).

The encoding unit 708 encodes the inputted video signal 734 in HD resolution, and outputs, as the bit stream 735 compliant with the ISO/IEC 14496-10, the encoded video signal 734. This is the same as in Modification 4. In contrast, the encoding unit 708 encodes, for each image, the position of the mouth of the speaker (the image of the mouth 710Ia) and the display time, and the object identifier 512, the display position, and the normal object size 515 inputted from the display area detecting unit 705, into User Data Unregistered SEI. Here, the image analysis unit 710 inputs the position of the mouth and the display time into the display area detecting unit 705. The position of the mouth or the like is encoded as object display information.

It is to be noted that, here, the output is the concept including the transmission to the external device and the accumulation into the recording medium.

Moreover, the encoding unit 708 can be normally configured with the MPU, the memory and so on. A procedure followed by the encoding unit 708 is normally implemented with the software, and the software is recorded on the recording medium such as the ROM. However, the encoding unit 708 may be implemented with the hardware (the dedicated circuit).

Next, the following describes the image synthesizing device 8 according to Modification 5.

The image synthesizing device 8 causes a decoding unit 801 to decode the bit stream 735 outputted from the image coding device 7, synthesizes the selected graphics object onto a video signal 832 obtained by the decoding, and displays the synthesized graphics object. The image synthesizing device 8 includes the graphics drawing unit 102, the image synthesizing unit 103, the storage unit 104, and the display area selection unit 609. This is the same as in Modification 4. Moreover, the image synthesizing device 8 includes the decoding unit 801 and a drawing control unit 806 in place of the decoding unit 601 and the drawing control unit 606.

The decoding unit 801 decodes a bit stream compliant with the ISO/IEC 14496-10. Although this is the same as in Modification 4, the decoding unit 801 further obtains, from User Data Unregistered SEI in the bit stream, object display information for displaying a balloon, and outputs the object display information.

It is to be noted that the encoding unit 801 can be normally configured with the MPU, the memory and so on. A procedure followed by the encoding unit 801 is normally implemented with the software, and the software is recorded on the recording medium such as the ROM. However, the encoding unit 801 may be implemented with the hardware (the dedicated circuit).

The drawing control unit 806 draws a graphics object at the display position inputted from the display area selection unit 609, every time an image is decoded by the decoding unit 801, which is the same as in Modification 4. Furthermore, the drawing control unit 806 causes the graphics drawing unit 102 to draw the balloon 806Ib (FIG. 18) based on the display time inputted from the display area selection unit 609, the position of the mouth of the speaker, and subtitle data held in the storage unit 104.

It is to be noted that the drawing control unit 806 can be normally configured with the MPU, the memory, and so on. A procedure followed by the drawing control unit 806 is normally implemented with the software, and the software is recorded on the recording medium such as the ROM. However, the drawing control unit 806 may be implemented with the hardware (the dedicated circuit).

As described above, the position of the mouth of the speaker and the balloon are recorded in the bit stream 735 in association with each other in Modification 5. This makes possible depiction that the balloon (the balloon 806Ib) is connected, based on the information obtained by the association, to the speaker (the image of the mouth 806Ia) at the time of reproduction. As a result, it is possible to easily provide a visual reality which cannot be provided by merely recording a video.

It is to be noted that although the example where the bit stream compliant with the ISO/IEC 14496-10 is used is described in Modification 5, the present invention is not limited to the example. A bit stream compliant with the ISO/IEC 13818-2 or the like may be used.

Moreover, according to Modification 5, the image coding device 7 and the image synthesizing device 8 may be provided in the same device or in separate devices.

Furthermore, although the example where the object identifier, the position of the mouth of the speaker as the amount of video characteristic, the display time, the display position, and the object size are used as parameters to be encoded in the bit stream 735 is described in Modification 5, the present invention is not limited to the example.

Moreover, although the example where the position of the mouth of the speaker is shown as the amount of characteristic obtained by analyzing the inputted video signal is described in Modification 5, the present invention is not limited to the example.

Furthermore, although the example where the object display information for displaying the balloon is encoded is described in Modification 5, the object display information may include the respective display information for the subtitle, the icon, and the widget shown in Modification 4.

For example, the following processes may be performed.

A subtitle or the like (a graphics object) may be synthesized onto each of images (the image before synthesis I in FIGS. 3 and 4, or the like) which are included in a video and captured at mutually different times.

Here, the video may be, for instance, a video broadcasted on TV, a CG (Computer Graphics) video displayed by a computer such as a video of a game, and other videos. The subtitle or the like to be synthesized may be, for example, information (a message or the like) about news, weather, and so on which is downloaded from the Internet, a message sent out in a blog or a twitter in the Internet, a text in a received e-mail, and other information.

However, there are cases where an area (the area R in FIGS. 3 and 4) in an image (the image before synthesis I) onto which the subtitle or the like is synthesized is an area (the area RI) suitable for synthesis and where the area in the image is an area (the areas Rm and Rh) unsuitable for synthesis.

Here, data (such as the above representative frequency) which indicates whether or not the area is the area (the area RI) suitable for synthesis may be obtained (calculated), and when the obtained data indicates that the area is the area suitable for synthesis, the subtitle or the like may be synthesized onto the area (the area RI), and when the obtained data indicates that the area is the area unsuitable for synthesis, the subtitle or the like may not be synthesized onto the area (the areas Rm and Rh).

However, when the area suitable for synthesis is an area having a high spatial frequency (the areas Rm and Rh) and the subtitle or the like is synthesized onto the area having the high spatial frequency (the areas Rm and Rh), the subtitle or the like is synthesized onto the area focused by a camera. Consequently, the image degradation occurs. In addition, a part having a high spatial frequency is near the subtitle or the like that is synthesized, and thus the viewability of the subtitle or the like that is synthesized is reduced.

Therefore, a spatial frequency (a representative frequency) of an area may be calculated as the data, the subtitle or the like may be synthesized onto an area (the area RI) for which the lowest spatial frequency among spatial frequencies of areas is calculated, and the subtitle or the like may not be synthesized onto an area (the areas Rm and Rh) for which the lowest spatial frequency is not calculated.

As a result, the subtitle or the like is synthesized onto the area (the area RI) having the lowest spatial frequency, and thus the image quality can be enhanced. In addition, it is possible to ensure the viewability of the subtitle or the like that is synthesized, and synthesize the subtitle or the like onto a sufficiently proper area.

However, for example, a position of the area having the lowest spatial frequency is frequently or drastically shifted at the time of a scene change, and thus often becomes a position unsuitable for synthesis.

In response, a detection unit (the counter 321 (FIG. 10 or the like)) which determines whether or not the scene change has just occurred may be provided. Only when the detection unit determines that the scene change has not just occurred, the subtitle or the like may be synthesized onto the area (the area RI) having the lowest calculated spatial frequency, and when the detection unit determines that the scene change has just occurred, the subtitle or the like may be synthesized not onto the area (the area RI) having the lowest calculated spatial frequency but onto another area (e.g. an area (the area Rm) having the second lowest calculated spatial frequency).

Consequently, it is possible to synthesize the subtitle or the like at a relatively proper position even at the time of the scene change, and thus surely synthesize the subtitle or the like at a sufficiently proper position.

As described above, constituent elements such as the display area detecting unit 105 are combined in the image synthesizing device, and a synergistic effect is generated from the combination. In contrast, all or part of the constituent elements are not included in the conventional technology, and thus the synergistic effect is not generated. The image synthesizing device differs from the conventional technology in this point.

The present invention is not limited to the embodiment and the modifications, and allows variations to be made. The scope of the present invention includes the variations.

It is to be noted that the present invention is not realized only as the device. The present invention may be realized as a method including, as steps, the processing units included in the device. Moreover, the present invention may be realized as a program causing a computer to execute the steps. Furthermore, the present invention may be realized as a computer-readable recording medium onto which the program is recorded such as a CD-ROM. Moreover, the present invention may be realized as information, data or a signal indicating the program. The program, the information, the data, and the signal may be distribution via a communication network such as the Internet.

The present invention is not limited to the embodiment and the modifications. The scope of the present invention includes embodiments to which various modifications conceived by those skilled in the art are made and embodiments obtained by combining constituent elements in different embodiments, so long as the embodiments do not materially depart from the novel teachings and advantages of the present invention. Specifically, for instance, one or both of the technique shown in FIGS. 10 and 11 and the technique shown in FIGS. 12 and 13 may be combined with the image processing system 6s shown in FIG. 14 and the image processing system 8s shown in FIG. 17.

In other words, the matters described in at least two mutually separate parts of the embodiment may be combined based on the common general technical knowledge. The combined embodiments are derived from the embodiment.

Industrial Applicability

As described above, the image synthesizing device (the image synthesizing devices 1 to 4 and the image processing systems 6s and 8s) provides an advantageous effect of synthesizing a graphic object onto a video more effectively than ever. This technology is useful for digital televisions including the image synthesizing device, mobile terminals, BD (Blu-ray Disc) recorders/players, and so on.

What is claimed is:

1. An image synthesizing device comprising:
a graphics drawing unit configured to draw a graphics object;
an image synthesizing unit configured to synthesize, onto an image, the graphics object drawn by said graphics drawing unit;
a detection unit configured to (i) analyze a spatial frequency of each of areas in the image, (ii) detect, among the areas, an area having the lowest analyzed spatial frequency, as a display position, (iii) perform the detection for each of decoded images, (iv) output the display position, which is currently detected, as a display position at a current display time, when a current time is specified not as an occurrence time of a scene change based on a movement distance of a display position, and (v) output a last display position when a current time is specified as an occurrence time of a scene change based on a movement distance of a display position; and
a drawing control unit configured to control said graphics drawing unit so that said graphics drawing unit draws the graphics object at the display position in the image which is outputted by said detection unit.

2. The image synthesizing device according to claim 1, further comprising:

a decoding unit configured to decode a bit stream inputted to said image synthesizing device from one of a digital broadcast signal receiving unit and a storage unit; and an object data storage unit configured to hold object data of the graphics object, wherein said image synthesizing unit is configured to perform the synthesis for the image indicated by a video signal obtained by said decoding unit decoding the bit stream, and said drawing control unit is configured to control said graphics drawing unit based on the object data held in said object data storage unit so that said graphics drawing unit draws the graphics object indicated by the object data.

3. The image synthesizing device according to claim 1, wherein said detection unit is configured to divide a part or a whole of the image into a plurality of blocks, and calculate a spatial frequency of each of the blocks, each of the areas in the image is an area which is suitable for an object size of the graphics object to be drawn and is composed of at least one of the blocks, and said detection unit is configured to determine, from among the areas, the area having the lowest spatial frequency which is determined based on the spatial frequency calculated for the at least one block in the area, and output a position of the determined area as the display position.

4. The image synthesizing device according to claim 2, wherein said object data storage unit is further configured to hold, for each of types of graphics object, an object identifier for the type, at least one display target area information item which defines a display area of the graphics object of the type, and normal display cycle information which defines a display interval of the graphics object of the type, and said drawing control unit is configured to perform the control based on the object identifier, the at least one display target area information item, and the normal display cycle information held in said object data storage unit.

5. The image synthesizing device according to claim 4, wherein said drawing control unit is configured to determine, for each of display times of the graphics object, display target area information of a display area including the display position outputted from said detection unit, from among display target area information items held in said object data storage unit, and said detection unit is configured to determine, from among display positions in the display area defined by the determined display target area information, a display position between the display time at which the display target area information is determined and a display time following the display time.

6. The image synthesizing device according to claim 2, wherein said detection unit includes a counter and is configured to (i) perform the detection for each of display times, (ii) compare a display position detected at a current display time to a display position detected at a last detection time, (iii) add a predetermined additional value to a value of the counter when a movement distance between the current display position and the last display position is less than a predetermined threshold, (iv) initialize the value of the counter when the movement distance is equal to or greater than the threshold, (v) output, as a display position at the current display time, the detected current display position when the value of the counter is equal to or greater than the threshold and the value of the counter specifies that a current time is not an occurrence time of a scene change, and (vi) output, when the value of the counter is less than the threshold and specifies that the current time is the occurrence time of the scene change, the last display position at each display time until the value of the counter becomes equal to or greater than the threshold, so as to wait for stabilization of the display position of the graphics object.

7. The image synthesizing device according to claim 2, further comprising a selection unit configured to select the graphics object from among a plurality of graphics objects, wherein said object data storage unit is configured to hold object data items, each of the object data items includes a display time of a corresponding one of the graphic objects, said selection unit is configured to select, for each display time, the graphics object indicated by the object data including the display time.

said detection unit is configured to perform the detection and the output for each display time, said drawing control unit is configured to cause said graphics drawing unit to draw, for each display time, the graphics object selected by said selection unit at the display time, at the display position outputted by said detection unit at the display time, and said image synthesizing unit is configured to synthesize, for each of images composing a moving picture and having a display time, the graphics object drawn by said graphics drawing unit at the display time, onto a corresponding one of the images at the display time.

8. The image synthesizing device according to claim 2, wherein said detection unit is configured to analyze the video signal, and perform a transition prediction of a position of the area having the lowest spatial frequency among the areas in the image indicated by the video signal.

9. The image synthesizing device according to claim 1, further comprising a color information comparison unit configured to (i) calculate a predetermined ratio between color information of a decoded image corresponding to the area detected by said detection unit and color information of the graphics object to be drawn by said graphics drawing object, (ii) calculate, when the calculated ratio is equal to or less than a predetermined threshold, color information of the graphics object so that a ratio to be calculated from the color information of the decoded image and the color information of the graphics object is greater than the predetermined threshold, and (iii) output the calculated color information to said drawing control unit, wherein, when said color information comparison unit outputs the color information, said drawing control unit is configured to cause said graphics drawing unit to draw the graphics object in a color determined by the outputted color information.

10. An image coding device which encodes a video signal inputted to said image coding device, into a bit stream, said image coding device comprising:

a storage unit configured to hold, for each of types of graphics object, an object identifier for the type and a normal object size which defines an object size for the type;

a detection unit configured to (i) sequentially read out the normal object sizes held in said storage unit, (ii) analyze a spatial frequency of each of areas in an image indicated by the inputted video signal, (iii) detect, among the areas, an area having the lowest spatial frequency, as a display position, (iv) perform the detection for each of decoded images, (v) output the display position, which is currently detected, as a display position at a current display time, when a current time is specified not as an occurrence time of a scene change based on a movement distance of a display position, (vi) output a last display position when a current time is specified as an occurrence time of a scene change based on a movement distance of a display position, and (vii) further output an object size and an object identifier; and an encoding unit configured to describe, in the bit stream, object display information including at least the display position, the object size, and the object identifier outputted by said detection unit.

11. The image coding device according to claim 10, further comprising an image analysis unit configured to detect an amount of characteristic by analyzing the video signal, and select, from among a plurality of graphics objects, a graphics object suitable for the video signal for which the amount of characteristic is detected, based on the detected amount of characteristic, wherein said encoding unit is configured to code, into the bit stream, object display information including at least an object identifier of the graphics object selected by said image analysis unit, the amount of characteristic detected by said image analysis unit, display time information, the display position detected by said detection unit, and an object size of the graphics object.

12. A non-transitory computer-readable recording medium for use in a computer, the recording medium having a computer program recorded thereon for causing the computer to execute:

drawing a graphics object;

synthesizing, onto an image, the graphics object drawn in said drawing;

analyzing a spatial frequency of each of areas in the image, detecting, among the areas, an area having the lowest analyzed spatial frequency, as a display position, performing the detecting for each of decoded images, outputting the display position, which is currently detected, as a display position at a current display time, when a current time is specified not as an occurrence time of a scene change based on a movement distance of a display position, and outputting a last display position when a current time is specified as an occurrence time of a scene change based on a movement distance of a display position; and controlling a process in said drawing so that the graphics object is drawn at the display position in the image which is outputted in said analyzing, detecting, performing, and outputting.

* * * * *